(12) United States Patent
Lehtinen

(10) Patent No.: US 7,890,060 B2
(45) Date of Patent: Feb. 15, 2011

(54) ENHANCED LOCATION BASED SERVICE FOR POSITIONING INTERSECTING OBJECTS IN THE MEASURED RADIO COVERAGE

(75) Inventor: Joni Lehtinen, Kangasala (FI)

(73) Assignee: Nokia Corporation, Espoo (FI)

( * ) Notice: Subject to any disclaimer, the term of this patent is extended or adjusted under 35 U.S.C. 154(b) by 1137 days.

(21) Appl. No.: 11/548,474

(22) Filed: Oct. 11, 2006

(65) Prior Publication Data

US 2008/0102756 A1    May 1, 2008

(51) Int. Cl.
*H04B 17/00* (2006.01)
(52) U.S. Cl. ............... 455/67.11; 455/67.13; 455/456.1; 455/404.2; 455/456.2; 455/513; 455/509; 455/63.1; 340/968; 340/539.1; 342/457
(58) Field of Classification Search .............. 455/67.11, 455/456.1, 404.2, 67.13, 456.2, 452.2, 513, 455/509, 450, 63.1; 342/357.09, 457; 705/14; 340/539.1, 968
See application file for complete search history.

(56) References Cited

U.S. PATENT DOCUMENTS

| | | | |
|---|---|---|---|
| 3,879,719 A | | 4/1975 | Buckley et al. |
| 4,027,303 A | | 5/1977 | Neuwirth et al. |
| 4,707,652 A | * | 11/1987 | Lowitz ........................ 324/631 |
| 5,268,698 A | | 12/1993 | Smith, Sr. et al. |
| 5,293,642 A | * | 3/1994 | Lo ........................... 455/456.2 |
| 5,596,332 A | * | 1/1997 | Coles et al. ................. 342/455 |
| 5,774,829 A | * | 6/1998 | Cisneros et al. ............. 701/213 |
| 6,067,017 A | * | 5/2000 | Stewart et al. ........... 340/573.1 |
| 6,144,338 A | * | 11/2000 | Davies ................... 342/357.13 |
| 6,169,475 B1 | * | 1/2001 | Browning .............. 340/286.02 |
| 6,201,482 B1 | * | 3/2001 | Schiefele et al. ............ 340/961 |
| 6,204,806 B1 | * | 3/2001 | Hoech ................... 342/357.02 |
| 6,249,252 B1 | * | 6/2001 | Dupray ...................... 342/450 |
| 6,332,127 B1 | * | 12/2001 | Bandera et al. ............... 705/14 |
| 6,333,691 B1 | * | 12/2001 | Janus ......................... 340/552 |
| 6,411,215 B1 | * | 6/2002 | Shnier ..................... 340/686.1 |
| 6,529,820 B2 | * | 3/2003 | Tomescu .................... 701/120 |
| 6,791,472 B1 | * | 9/2004 | Hoffberg .................... 340/905 |
| 6,850,186 B2 | * | 2/2005 | Hellsten ....................... 342/93 |
| 6,924,748 B2 | * | 8/2005 | Obradovich et al. ........ 340/905 |

(Continued)

FOREIGN PATENT DOCUMENTS

WO        91/13415        9/1991

OTHER PUBLICATIONS

International Search Report for PCT/IB2007/053506 dated Jan. 15, 2008.

(Continued)

*Primary Examiner*—Marceau Milord
(74) *Attorney, Agent, or Firm*—Locke Lord Bissell & Liddell

(57) ABSTRACT

A method, apparatus or tangible computer medium (which stores computer executable code or program code) performs or facilitates obtaining information concerning one or more characteristics of one or more monitored wireless signals or links, such as radio frequency (RF) signals, transmitted across a geographic area; and detecting a presence of an object in the geographic area according to a variation of a characteristic of one or more of the RF signals reflecting interference of the RF signal(s) by the object.

31 Claims, 25 Drawing Sheets

U.S. PATENT DOCUMENTS

| | | | | |
|---|---|---|---|---|
| 6,980,151 | B1* | 12/2005 | Mohan | 342/13 |
| 7,026,931 | B2* | 4/2006 | Tsuji | 340/552 |
| 7,038,584 | B2* | 5/2006 | Carter | 340/539.13 |
| 7,053,797 | B2* | 5/2006 | Taylor | 340/961 |
| 7,132,982 | B2* | 11/2006 | Smith et al. | 342/456 |
| 7,242,347 | B2* | 7/2007 | Brenner | 342/357.03 |
| 7,268,700 | B1* | 9/2007 | Hoffberg | 340/905 |
| 7,271,766 | B2* | 9/2007 | Zimmerman et al. | 342/464 |
| 7,308,273 | B2* | 12/2007 | Zhang | 455/456.1 |
| 7,348,895 | B2* | 3/2008 | Lagassey | 340/907 |
| 7,433,696 | B2* | 10/2008 | Dietrich et al. | 455/456.2 |
| 7,528,772 | B2* | 5/2009 | Ruutu et al. | 342/357.09 |
| 7,538,715 | B2* | 5/2009 | Langford et al. | 342/90 |
| 7,564,816 | B2* | 7/2009 | McHenry et al. | 370/329 |
| 7,576,695 | B2* | 8/2009 | Smith et al. | 342/465 |
| 7,616,555 | B2* | 11/2009 | Hart | 370/203 |
| 7,626,969 | B2* | 12/2009 | Hart et al. | 370/338 |
| 7,680,501 | B2* | 3/2010 | Sillasto et al. | 455/456.1 |
| 7,734,298 | B2* | 6/2010 | Bhattacharya et al. | 455/456.1 |
| 2006/0276201 | A1* | 12/2006 | Dupray | 455/456.1 |

OTHER PUBLICATIONS

"BAE Systems and Roke Manor Research Team to Develop Revolutionary Cellphone Radar", ROKE Press Release, Jul. 24, 2002.

Steve Bush, "Radar with Cell Phones? Look at CellDar, Mobile Phones Make Cheap Radar?", Electronic News, Aug. 12, 2002.

"BAE Systems Selects Nokia to Supply GSM/EDGE Network", Nokia Press Release, May 3, 2006.

* cited by examiner

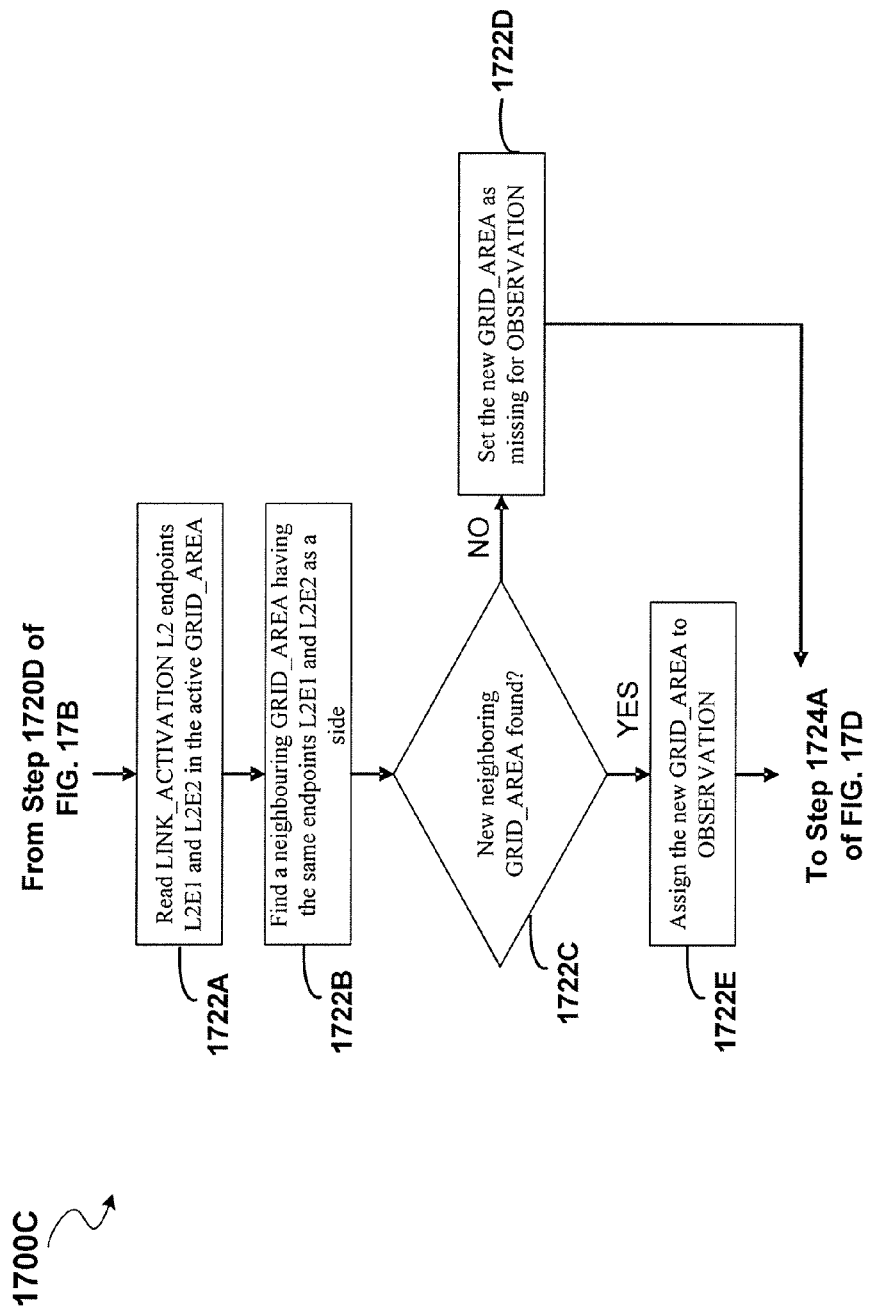

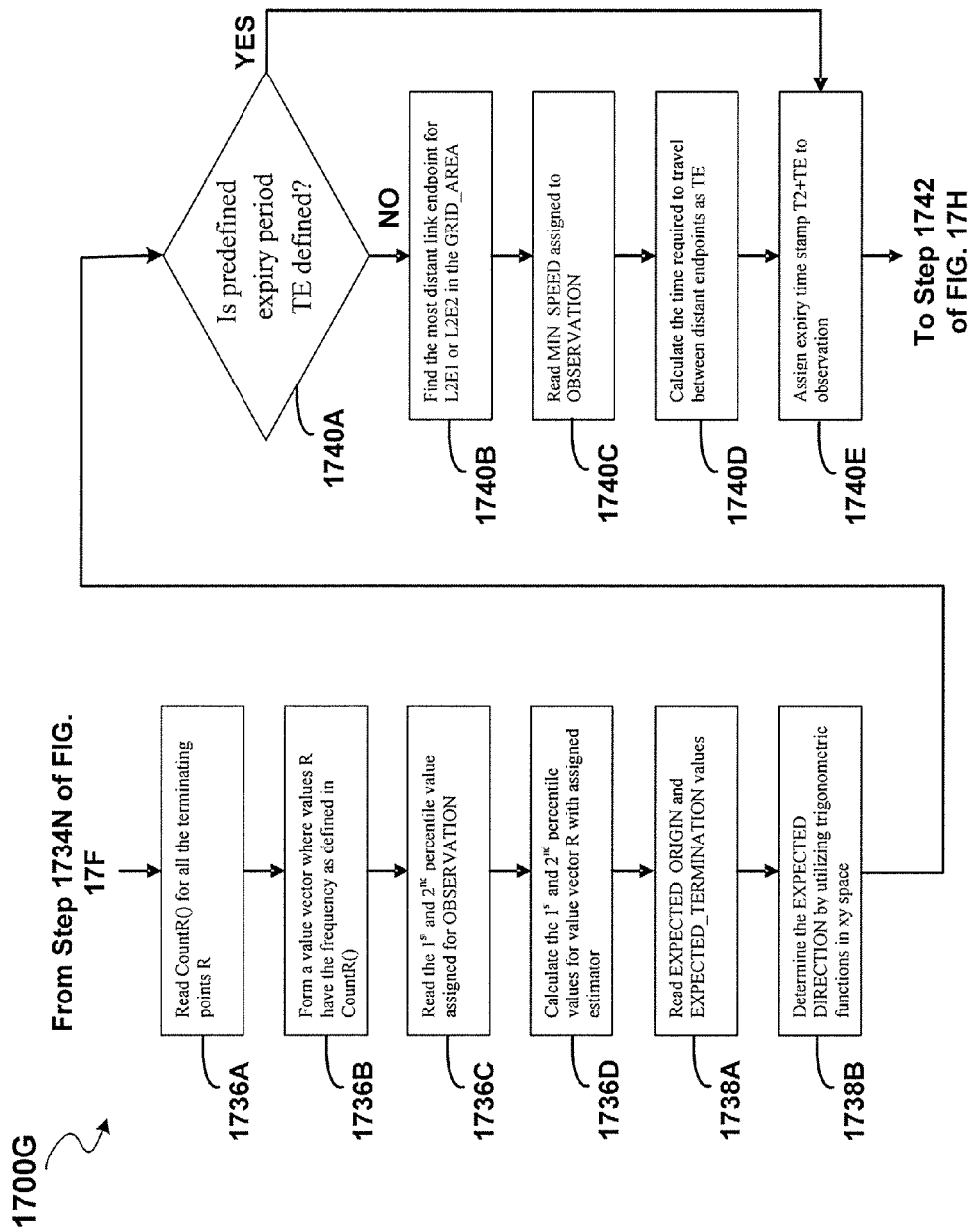

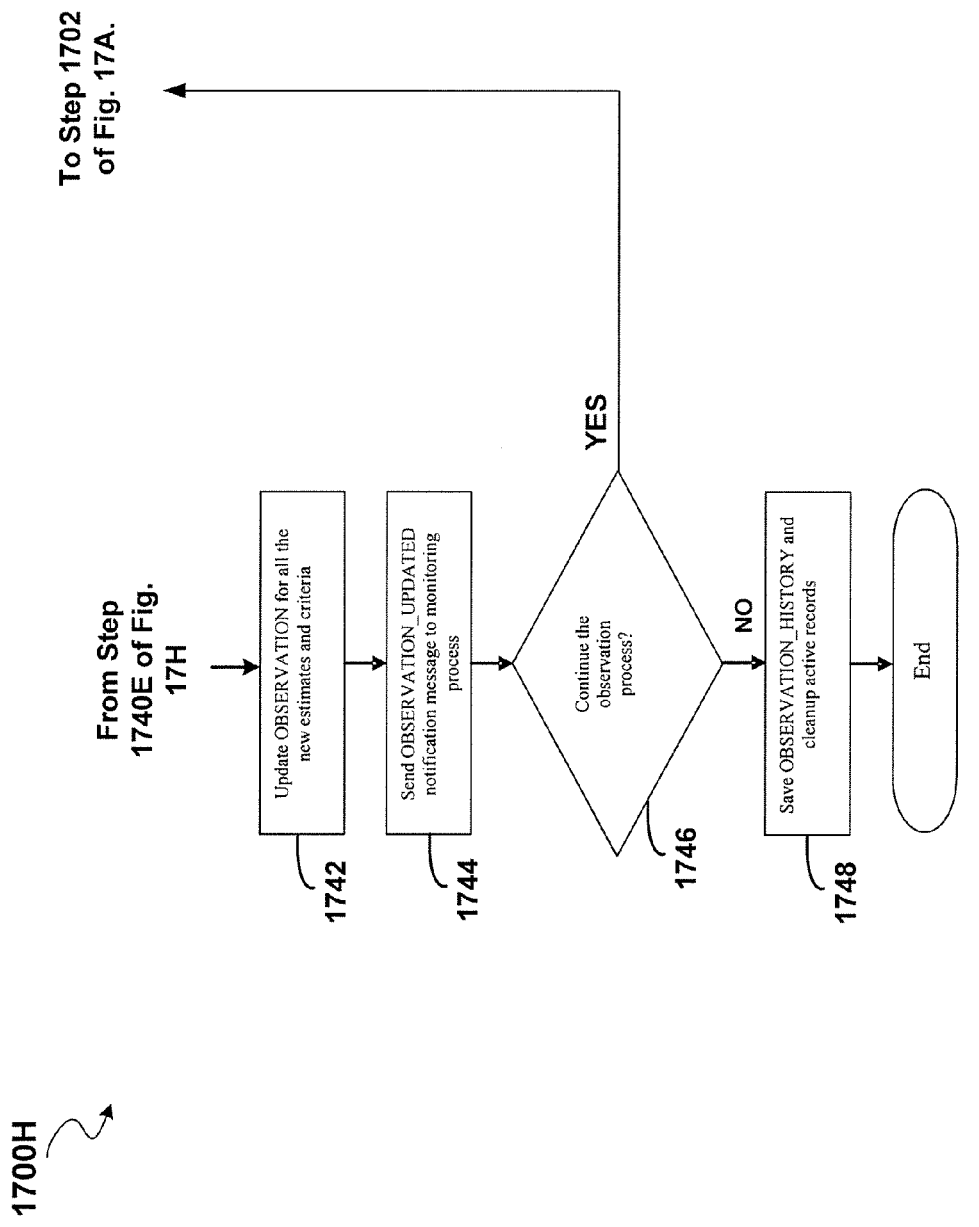

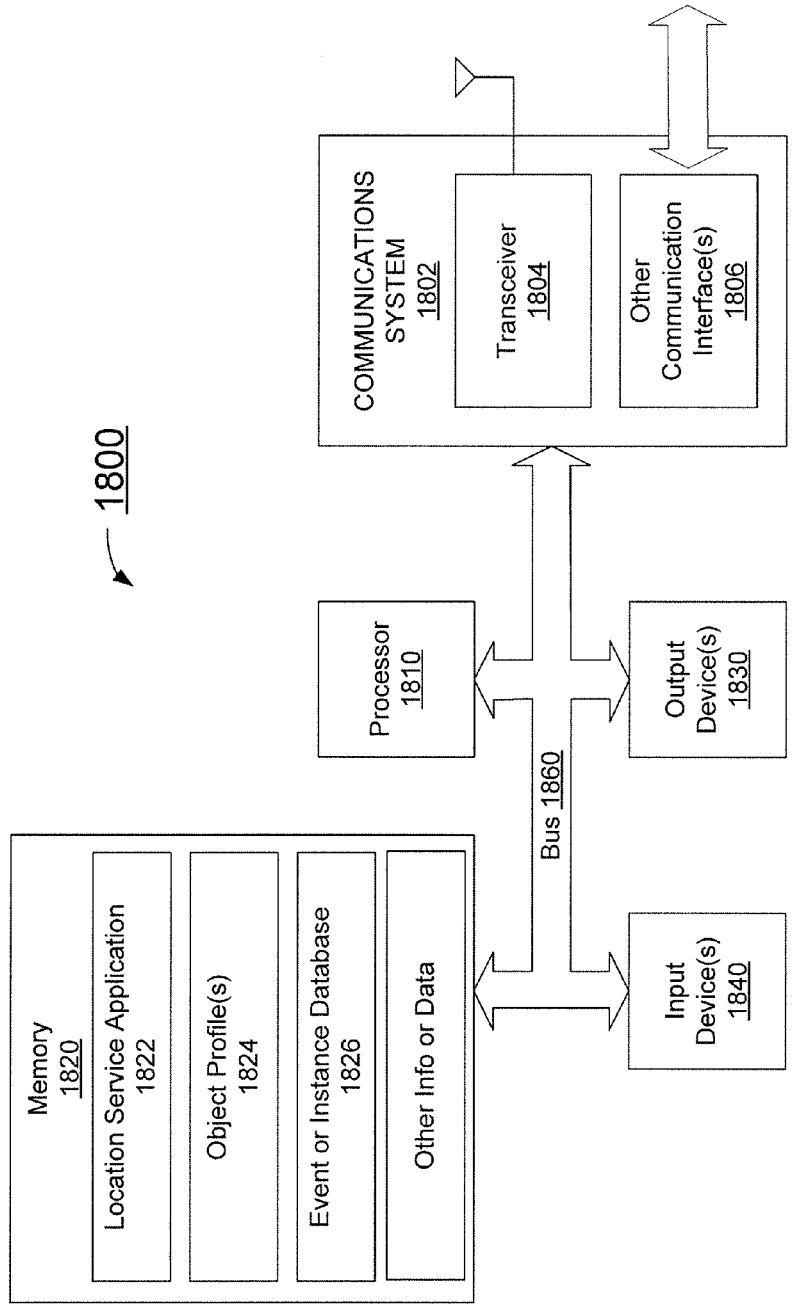

ENHANCED LOCATION BASED SERVICE FOR POSITIONING INTERSECTING OBJECTS IN THE MEASURED RADIO COVERAGE

FIELD OF THE INVENTION

The present invention relates to wireless communications and, more particularly, to monitoring of objects in a geographic area(s).

BACKGROUND

Many countries have highly developed systems for defense, especially for guarding their airspace against intruders or intrusions. This is necessary in addition to careful control of commercial and planned recreational traffic, which is managed by flight control in the area. In this case, any communication related to aircraft identification and flight plan is an initiative towards flight control, which will process the provided information before granting approval for the aircraft and planned route. This leads to identified and planned traffic in the airspace, where all the relevant communication channels can be used to control the traffic further. The control of other traffic, e.g. approaching unidentified aircraft, can be assumed to be a matter of national security, and is usually performed by military representatives or authorities.

Different radar systems can provide an image of unidentified traffic in the airspace, and serve military authorities in controlling approaching aircrafts also in neighboring airspace. The difference to commercial traffic is mainly in the method of creating an image, which relies on two-phase radars rather than signal received from transponders identifying the commercial aircraft. Radar systems are major investments, and can utilize multiple information sources to create an image of controlled airspace. There is also rather big difference in the utilization of resources under the normal state of readiness and elevated readiness (due to estimated or ongoing crisis). Therefore, a feasible utilization of resources can mean reduced control and image of the airspace, if there is no reason for elevated readiness (e.g. to populate multiple fixed or mobile radar stations for better coverage).

SUMMARY

In accordance with an embodiment, a method, apparatus or tangible computer medium (which stores computer executable code or program code) performs or facilitates obtaining information concerning one or more characteristics of one or more monitored wireless signals or links, such as radio frequency (RF) signals, transmitted across a geographic area; and detecting a presence of an object in the geographic area according to a variation of a characteristic of one or more of the RF signals reflecting interference of the RF signal(s) by the object.

The one or more RF signals may include one or more RF links between stationary signal source(s) and/or stationary receiver(s) and may form a plurality of grids over the geographic area. The signal source(s) or receiver(s) may be part of a wireless or mobile communications infrastructure. Further, the variation may be a degradation of a signal strength of an RF signal. The RF signals may be filtered to reduce noise.

In accordance with a further embodiment, a method, apparatus or tangible computer medium (which stores computer executable code or program code) may further perform or facilitate detecting at least two instances of the object interfering with RF signals according to a variation of a characteristic of the RF signals at different times; and estimating a location of at least a terminating or originating route point of the at least two instances at which the object interfered with the RF signals.

The location may be estimated based on at least a probability density function (PDF) applied to possible terminating or originating route points. The PDF may be uniform or customized. The location may also be estimated based on at least a maximum speed constraint. The path of the object may be determined based on at least an estimated terminating or originating route point. The path of the object may be updated as new instances of interference with the RF signals by the object are detected.

The plurality of RF signals may form a plurality of grid areas in the geographic region, and the location may be estimated by reducing an active grid area in the geographic area traversed by the object. The active grid area may also be reduced by determining possible routes or possible originating and terminating route points in an active grid area bound by the RF signals interfered by the object and an assumed maximum speed of the object.

Furthermore, a weight may be applied to each possible route or each possible originating and terminating route point according to a probability density function (PDF), in which the location of at least the terminating or originating route point of one of the at least two instances at which the object interfered with the RF signals may be estimated based on the weighted possible routes or weighted possible originating and terminating route points.

An expected direction to be traveled or traveled by the object may be determined based on an estimated originating and terminating route point of two instances at which the object interfered with the RF signals. A confidence area may be determined for an estimated terminating route point.

Information pertaining to each detected instance of an object interfering with an RF signal may be stored. This information may include among other things information pertaining to the interfered wireless signal and a time at which the interference occurred. Furthermore, a layout of the RF signals over the geographic area as well as information pertaining to an object in the geographic area may be displayed.

These and other exemplary embodiments and aspects are described in greater detail below.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The various embodiments will be described with reference to the accompanying drawings, wherein:

FIGS. 17A through 17H illustrate a flowchart of an exemplary process of an object location service, in accordance with an embodiment; and FIG. 18 illustrates components of an exemplary system, device or component which implements in whole or in part one or more of the various functions and operations of an object location service, in accordance with an embodiment.

DETAILED DESCRIPTION OF VARIOUS EMBODIMENTS

I. Exemplary Operational Environment(s)

Before describing the various exemplary embodiments in detail, it is helpful to first describe one or more exemplary location service systems or environments in which an object location service, such as to detect and track objects, may be employed.

A. One Exemplary Operational Environment

Figure 1:
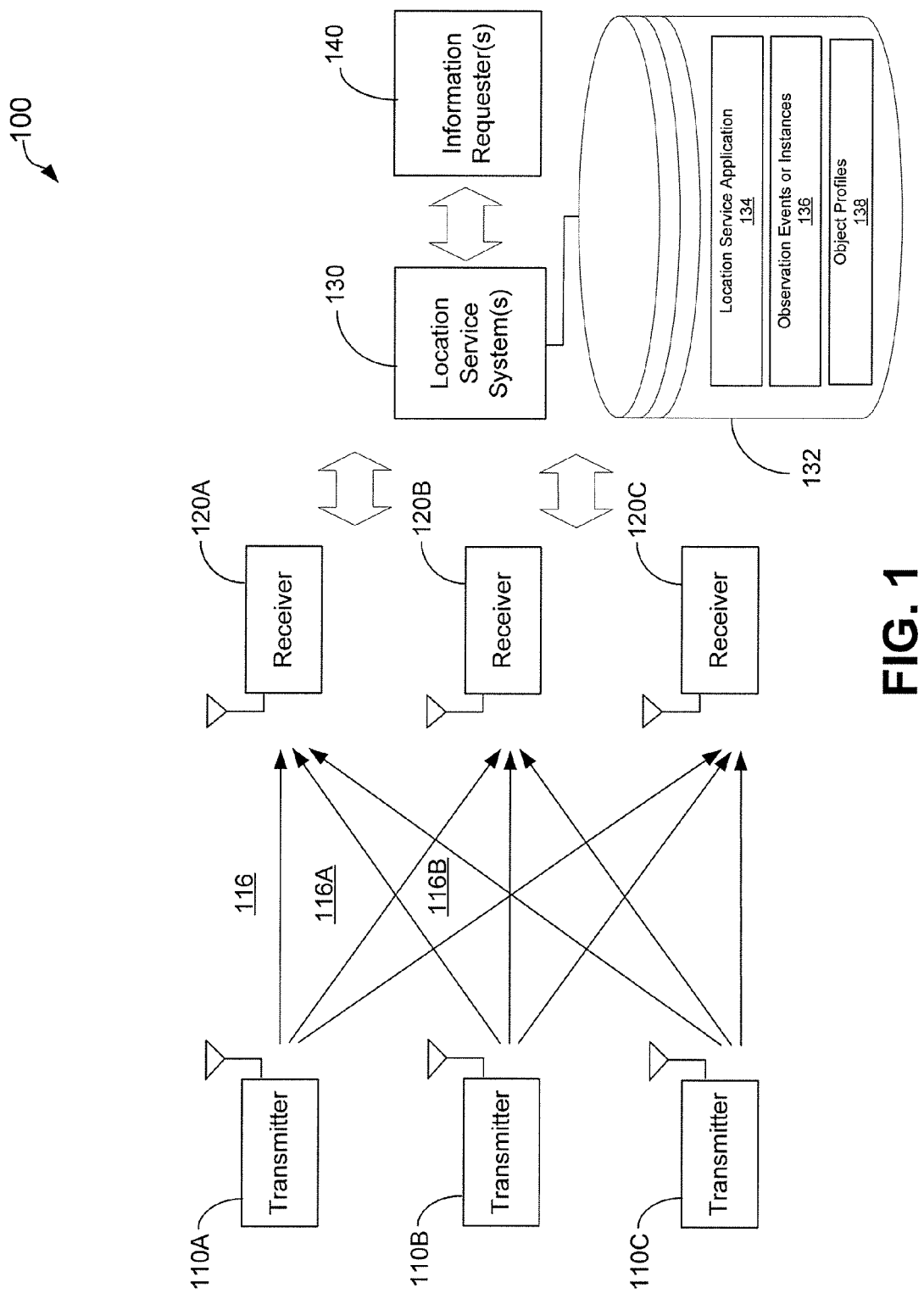
FIG. 1 is a diagram of an exemplary operational environment, according to an embodiment.

FIG. 1 is a diagram of an exemplary operational environment 100 in accordance with one embodiment. This environment includes one or more transmitters 110A-C, one or more receivers 120A-C, a location service system(s) 130, an observation events or instances database 132, and an information requester(s) 140.

The transmitter(s) 110A-C transmits wireless signals, for example, radio or radio frequency (RF) signals, which are received by receiver(s) 120A-C. These wireless signals may be transmitted across and/or over one or more predetermined geographic areas or regions 116 along predefined or predetermined or known pathways; may be wireless links or steady wireless signals; may be transmitted between one or more stationary transmitters 110A-C (e.g., signal source), which may be stationary, and one or more receivers 120A-C (e.g., receiving end) which also may be stationary; and/or may be RF signals such as those in a frequency or frequency range(s) employed or detectable by a mobile or wireless communications network or architecture, such as 2G or 3G network, GSM, GPRS, UTRAN, UMTS or any radio-based signaling network or architecture, so forth. As shown in the example of FIG. 1, a network of wireless signals or links may form or define a plurality of grids (e.g., 116A, 116B) or sub areas or trip wires in an airspace of the geographic area 116 between the transmitters 110A-C and receivers 120A-C.

The receiver(s) 120A-C can be configured to receive one or more wireless signals (or links, and to ascertain or monitor one or more characteristics, such as signal strength or degradation, errors or error rates, etc., of received wireless signals or links, and to collect information pertaining to any of the received wireless signals or links. The collected information may include information or data relating to an observation of an instance or event of a variation of a characteristic of a signal or link, an identity of the particular signal or link or its path or coordinates, any other signals which intersect the particular signal or link, a time of observation of the instance or event (e.g., time stamp), an angle of reception for the particular signal or like (which may be predetermined or predefined) and/or any other information which may be useful in identifying a presence of an object and determining movement of the object in the geographic area 116 or particular grids or sub-areas (e.g., 116A, 116B, etc.) thereof. This collected information may thereafter be made available or provided to or sent to the location service system 130 or other systems, devices or components or parties, such as automatically or upon request.

Since wireless signals or links may be subject to different environmental conditions (e.g., high or low signal traffic zone, fixed structures, characteristic of the transmitter or signal source for a signal, distance traveled, particular band or frequency range, etc.), the receiver(s) 120A-C may also be configured with filter(s) to filter or reduce undesirable signals from any wireless signal, or amplifier(s) to boost reception for weaker signals, signal canceling technologies for canceling undesirable signals, and/or so forth. These and other aspects pertaining to signal or link reception may be configured selectively for each or a group or all wireless signals or links, for example, according to environmental conditions as well as desired positioning of the signal pathways. Further, the receiver(s) 120A-C may be configured to monitor and measure one or more characteristics of a received signal or link, and to compare the measured characteristic with some threshold or value or range to ascertain whether an object has interfered or intercepted a particular or any wireless signal or link. The transmitters 110A-C or rather signals transmitted therefrom may likewise be configured or modified according to the environmental conditions as well as desired positioning of the signal pathways. For the purposes of discussion, a wireless signal or link which has been or is assumed to be interfered with or intercepted by an object may be considered an "active" signal or link, and a grid which has or is being traversed by an object can be considered an "active" grid.

The location service system 130 may be any computerized or processor-based system, such as a server(s) or network signal processing component, which is communicatively coupled to receiver(s) 120A-C. In this example, the location service system 130 is shown as a centralized facility which among other things can obtain, receive and/or maintain information (or data) pertaining to one or more of the received wireless signals or links (e.g., event or instance data of observations); can process this information to determine whether or not an object is present in a geographic area(s) and to track or predict or estimate movement of the object through the geographic region; and can provide to or make available to or notify other parties or information requesters, such as requester(s) 140, of such information including the presence, expected location(s), direction of travel, and so forth pertaining to the object.

The location service system(s) 130 may include or have access to a memory 132 that maintains information and data, such as location service application(s) 134 for implementing or controlling functions and operations described herein with reference to the object location service. The memory 132 may also maintain observed events or instances 136 which maintain various information pertaining to events or instances of an object interfering with a wireless signal or link. This information can be information such as the collected information noted above (e.g., identity or path of particular interfered or active signal or link, time of interference, angle of reception of signal at the received location, measured or detected characteristic of signal or link, etc.). The memory 132 may further maintain object profiles 138 for customizing object location service such as for example to configure location detection and tracking for a particular type of object (e.g., commercial or military plane, helicopter, etc.), or any other information or data or application or programs and so forth for implementing the location service functions and operations described herein (e.g., assumptions such as maximum speed assumptions, uniform or customized PDFs, etc.).

Based on predetermined or predefined information pertaining to each of the received signals or link at particular receivers 120A-C and various assumptions, it is possible to observe or detect an instance or event of a presence of an object in a geographic area or sub-area or grid (including reducing the possible area) by measuring and monitoring variations or changes in a characteristic of received wireless signals or links and to track or predict or estimate a location of the object and its direction of movement over time with each additional observed or detected instance and event of the object interfering with one or more of the wireless signals or links. The observation or detection of a first instance or event of interference can provide at the least information that an object is in a geographic area, and any second or subsequent instances or events may be used to estimate or predict an originating and/or terminating route point, route, direction and confidence area and to form a trace of the object.

For example, as shown in FIG. 1, each wireless signal or link of the signal network may define a boundary for a grid or sub-area as well as endpoints. Thus, with two or more observed instances or events over a period of time and, for example, any additional assumptions such as a maximum speed of an object, the path of received wireless signals or links, an angle of reception and/or so forth, it is possible for example to reduce the possible presence or active area of an object, to determine possible routes and/or possible originating and terminating route points, to apply some probabilistic value or weight to each possible route or point based on a probability density function (PDF) (e.g., uniform or customized PDF) and, accordingly, to estimate or predict routes, location points, direction, confidence area, and so forth of the object such as at various times. It is further possible to output (e.g., display such as in a GUI) this and other information with respect to the geographic region and provide a trace and update as more events and instances associated with the object are observed or detected. Exemplary calculations and determination methodologies including, for example, a process referred to as MOSAIC to form a trace image of activated network segments looking like a mosaic, are shown and described below in more detail with reference to FIG. 14.

The information requester(s) 140 may be server(s) or computer(s) or processor-based system or information repository of a party which may have use for the identification and tracking of known or unknown objects in particular regions. These parties may include governmental agencies or institutions (e.g., the military, defense department, aviation agencies, etc.), businesses, individuals, and so forth. The information provided to the information requester(s) 140 may be encrypted, and access to such information may also be subject to other security measures, such as authentication, passwords, registration, and so forth.

The environment 100 of FIG. 1 is simply provided as an example. The functions and operations and components including the number and type of networks, components, signal patterns, geographic area, the number and types of wireless signal may be varied, as desired, to implement the object location services described herein. Further, the object location services system and environment may be implemented in a distributed manner to cover plural geographic areas in a centralized or decentralized manner, or may employ a further distributed architecture (such as a tree structure) for the processing of event or instance observations from different geographic areas, or may employ a stand along receiver (e.g., 120A-C) incorporating the functionality of the location service system 130, or may employ an infrastructure of mobile and/or line-based networks (e.g., communications networks) to implement one or more aspects of the object location services.

B. Another Exemplary LCS/UTRAN Operational Environment

Figure 2:
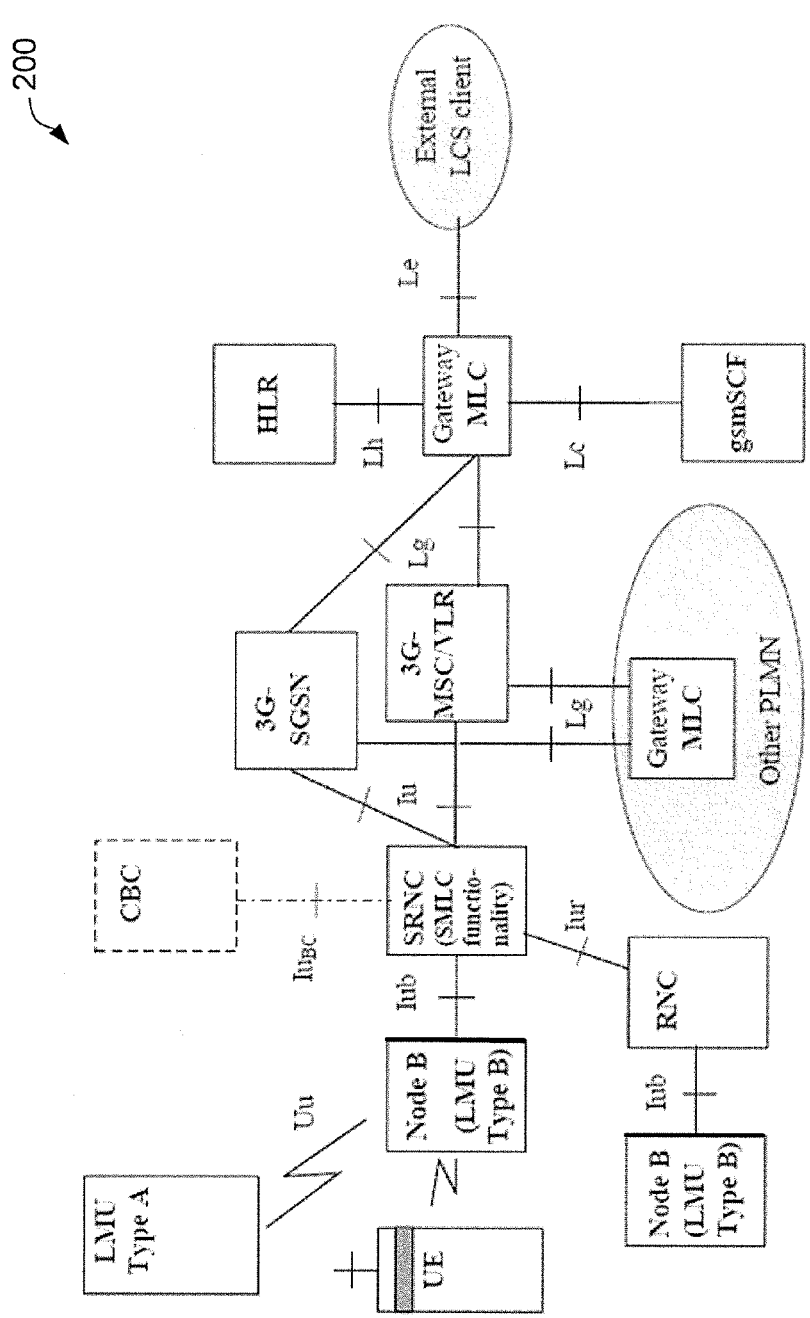
FIG. 2 is a diagram of an exemplary operational environment such as LCS in UTRAN network architecture, according to another embodiment.

FIG. 2 illustrates a block diagram of an exemplary Location Service (LCS) in a UMTS Terrestrial Radio Access Network (UTRAN) architecture 200, whose facilities or components may be employed to integrate and implement the object location service, such as including for example the detection and tracking of an object and distribution of related information, as described herein.

As shown, the exemplary LCS architecture 200 includes various network components which will be briefly described below. For instance, this architecture 200 includes user equipment (UE), location measurement units (LMUs) of types A and type B, radio network controller (RNC), serving RNC (SRNC) with Serving Mobile Location Centre (SMLC) functionality, cell broadcast center (CBC), third generation serving GPRS (General Packet Radio System) support node (3G-SGSN), third generation Mobile Switching Center/Visitor Location Register (3G-MSC/VLR) and gateway Mobile Location Centers (MLCs) to other Public Land Mobile Network (PLMN), Home Location Register (HLR), GSM Session Control Function (gsmSCF) and external location service (LCS) client. Various internal or external interfaces, such as Uu, Iub, Iu$_{BC}$, Iur, Iu, Lg, Lh, Lc and Le, are provided for interconnectivity between functional entities or components in the architecture 200.

In general, the LCS architecture 200 is able to measure radio signals to determine or calculate the geographic position of the user equipment (UE), and to provide an infrastructure and format to transmit position information (e.g., coordinates and time) of the UE to a client (e.g., application). This position information may also be utilized within the network, as desired.

The exemplary architecture 200 can offer a suitable platform, i.e., hardware and software, to collect and distribute location information of an interfering object to a third party or information requesting party (e.g. the GMLC which can provide access to third party location requests). The architecture 200 may also among other things be 3GPP standard compliant, which does not exclude transferring other than UE related location information, but leaves this opportunity unspecified.

Thus, this standard can be suitably modified to incorporate and implement appropriate protocols and identifiers and data or message formats to facilitate the transfer of object location information for the object location services as described herein.

Further, the LMU can be modified to measure other than GSM/WCDMA frequencies, and also to change the focus from User Equipment to measuring signal or link characteristics such as fast power degradation in received steady signal. This can, for example, enable or facilitate measuring of the approximate location of an interfering object, as the angle of received signal is known in advance (e.g., Angle of Arrival method). Multiple LMUs with multiple stationary signal sources may form a network of "trip wires" or grids in the airspace, and the architecture 200 can be configured for new frequencies and signal sources on a regular basis. The SMLC can also have a role in combining messages from multiple LMUs (e.g., more advanced positioning methods are enabled, including tracing), and more independent system implementation can be introduced with standalone LMUs.

When operational, the object location services as described herein can act as a primary or additional information source, and provide observations with location details to various parties (as discussed above), such as government system forming image about the airspace over a monitored geographic area or region or sub-area or region. The object location service system and environment can be used for a variety of purposes, such as for example, providing supplementary information for people in charge of the airspace.

Accordingly, in accordance with an embodiment, various functions pertaining to object location services as described herein may be distributed and incorporated among the various components or elements, such as LMU, SMLC and GMLC, in the LCS architecture 200. Other components or elements in this architecture may be affected or employed, as desired, in the implementation of object location services as well.

For instance, with respect to the LMUs, the LMU A or B may have a wideband antenna(s) available, which can be optimised for receiving signals from target transmitters (or sources). The LMU Type A can utilize the Uu interface in signalling, and is defined in the LCS systems as a mobile subscriber. This may enable installing LMU equipment more independently from available telecom infrastructure, and service can be billed as normal traffic. Limited remote operations and maintenance (O&M) capability can be provided here. The LMU B can also utilize the site transmission, and O&M capabilities of a parent node.

Further, the LMU A or B can be configured to measure certain amount of signals, and may operate continuously after a START message. The LMU Type A or B can perform operations based on other standard messages, like STOP measurement or RECONFIGURE message to define new set of frequencies. The LMU Type A or B can have a function to analyze sudden fading in received signal, and can utilize a set of parameters in defining thresholds for expected signal variation. A deviating signal may be reported as an event with LMU identification and supplementary information about frequency and time of occurrence.

The LMU Type A or B may also provide a function to filter noise or undesirable signals, such as more permanent fading, occurring over longer period. It is also possible to send an alarm or notification about the weakened conditions in a configured signal(s) or link(s). The LMU Type A or B can further have more advanced signal processing to identify same fading in multi-path signal. This can be useful for filtering in a case where the transmitting target is not sending continuous signal, or the signal is subject to interference. It is also possible to send an alarm or notification about suspicious conditions in a configured signal(s) or link(s). The LMU Type A or B can also have a scheduled function that will change the measured frequencies and target transmitters according to predefined sequence(s). The LMU Type A or B can have an encrypted implementation for confidential information as measured frequencies and schedules.

With respect to the SMLC or SRNC, the SMLC can store detailed information about each and every LMU, including the measured signals or links with frequency and LMU and target co-ordinate information. The SMLC can operate in a mode that transfers some or all relevant raw messages to a third party or information requester via the GMLC, and may act only as a controlling point in storing LMU and target related information. It is also possible to limit information to plain LMU identification, measured arbitrary channel number, and time. This would be valid in case all the logic in analyzing the messages exists in the third party system.

In other exemplary cases, the SMLC can process received LMU messages in a joint manner, meaning focus change in the LMU areas after receiving message about power degradation in the signal or link. The SMLC can expect messages from the neighboring LMUs after initial stimulus, and can differentiate multiple initial stimuli according to maximum speed criteria. The SMLC can process each message by evaluating the neighboring LMU situation and received initial messages. The SMLC can combine received messages into traces, and can for example utilize assumption about maximum speed and received or lacking messages from neighboring LMUs. This may be useful for example to reduce possible location in each step, and to form a confidence area and direction estimate for observation. Exemplary processes or implementations for these and other aspects are described below in further detail.

With respect to the GMLC, this provides a messaging interface for third party ($3^{rd}$) party system to control processes in SMLC and LMU (e.g., Le interface). The GMLC may enable controlling the configured SMLC/LMU equipment by resetting the parameters, but the SMLC can have the same function implemented. An exemplary advantage of the GMLC implementation is more autonomous management of related SMLC and LMU data by a third party. Some GMLC functions can also be omitted, as desired, if a standalone LMU is managed by specific messaging via air interface (e.g., reconfiguring the signals or links, etc.)

In view of the foregoing examples, the object location services as described herein may be implemented or integrated with various mobile or wireless networks, for instance, an existing mobile communications network or LCS-enabled mobile network. Since existing mobile networks have hundreds of thousands of base stations covering majority of continents, this infrastructure could be utilized in passive radio intelligence under normal state of readiness. Mobile networks can provide a decentralized antenna system over defended area with a utility of centralized monitoring and control over local operation mode. A decentralized system may also be less vulnerable for sabotage, and groups of base stations can be combined for joint operation in the desired focus area. The implementation of the object location services, as described herein, also provides for example an appealing opportunity for operators to provide services for governments. As a result, governments for example do not have to make major investments in order to have an advanced or generally more advanced defense technology in use.

More specifically, the object location service may provide, by way of example, various benefits or advantages, as follows:

(1) provides an economic approach by utilizing existing network infrastructure in building a whole new information source for airspace control;

(2) provides extensive coverage without any additional human resources;

(3) preserves or saves state-of-art defence systems for use in crisis, or when extreme control is needed;

(4) enables introducing sensors that are capable of detecting objects without transmitting signal;

(5) enables further development of raw measurement analysis, e.g. mathematical models utilizing the input in reducing the area of expected location (e.g., leaves further more advanced modelling open);

(6) enables defining extremely tight network of signals, which are spread over wide band of frequencies and can be covering different layers in the airspace;

(7) enables monitoring the neighboring airspace without any transmitted signal (foreign transmitters can be very distant);

(8) can be benchmarked against radar images (e.g., no separate optimization needed in most cases, but signals or links can be validated with commercial traffic); and (9) can provide secure $3^{rd}$ party system integration is defined in 3GPP standards.

Furthermore, as a default, the system can be extended to GSM/WCDMA frequencies, but there is a challenge in filtering the interference caused by local traffic volumes (i.e. fading not caused by intersecting objects but other transmitting equipment). Multi-path signal analysis may be employed to address this issue. As another default, the system may also be able to detect other phenomena causing power degradation in the signal. Such phenomena may be tornados (with particles interfering with the signal or link), or other extreme conditions in the airspace.

When being implemented through LCS mobile network, some issues may also arise. For example, cluttering stimulus can be an issue if it is assumed that only the intersecting objects cause the power degradation. Occasional shadow fading caused by other temporary but repeating factors can give false indication about intersecting objects in the area. However, a bad link can be measured and replaced with better one. Also, radio interference can be generated as a countermeasure. Discontinuous transmission would have the same impact, as it would not be possible to know if sudden fading is due to lack of transmission or intersecting object. Both of these can be managed by selecting multiple transmitting targets, or by analyzing the multi-path signal.

Further, existing LMU implementations may not support measuring other than GPS/GSM/WCDMA frequencies, so some additional hardware may need to be integrated or installed into such networks in relevant sites or locations as well as some modifications or addition of software components. In addition, information about measured frequencies and target transmitters may be considered national secrets, and it is not clear what level of data encryption is sufficient in the operator system. As such, this information may be defined in a manner or restricted so that it is not available to anyone else other than LMU software and authorized third parties.

Finally, although complex, signals or links may be configured and predefined to cover desired ranges horizontally as well as vertically (e.g., at different altitudes), initial signal or link planning may be a complex process when varying altitudes need to be covered. The particular type of signals or links, e.g., their frequencies, transmission strength, etc., and the location of the transmission and reception sources may be configured to address desired coverage as well as environmental conditions which may impact such signals or links.

II. Exemplary Operational Implementation

Provided below is a description of exemplary terms, assumptions and methodologies with reference to FIGS. 3-8 relating to various exemplary aspects of the object location service. This description will subsequently be followed by an exemplary description of an exemplary operational implementation with reference to FIGS. 9-13.

A. Exemplary Methodology

Figure 3:
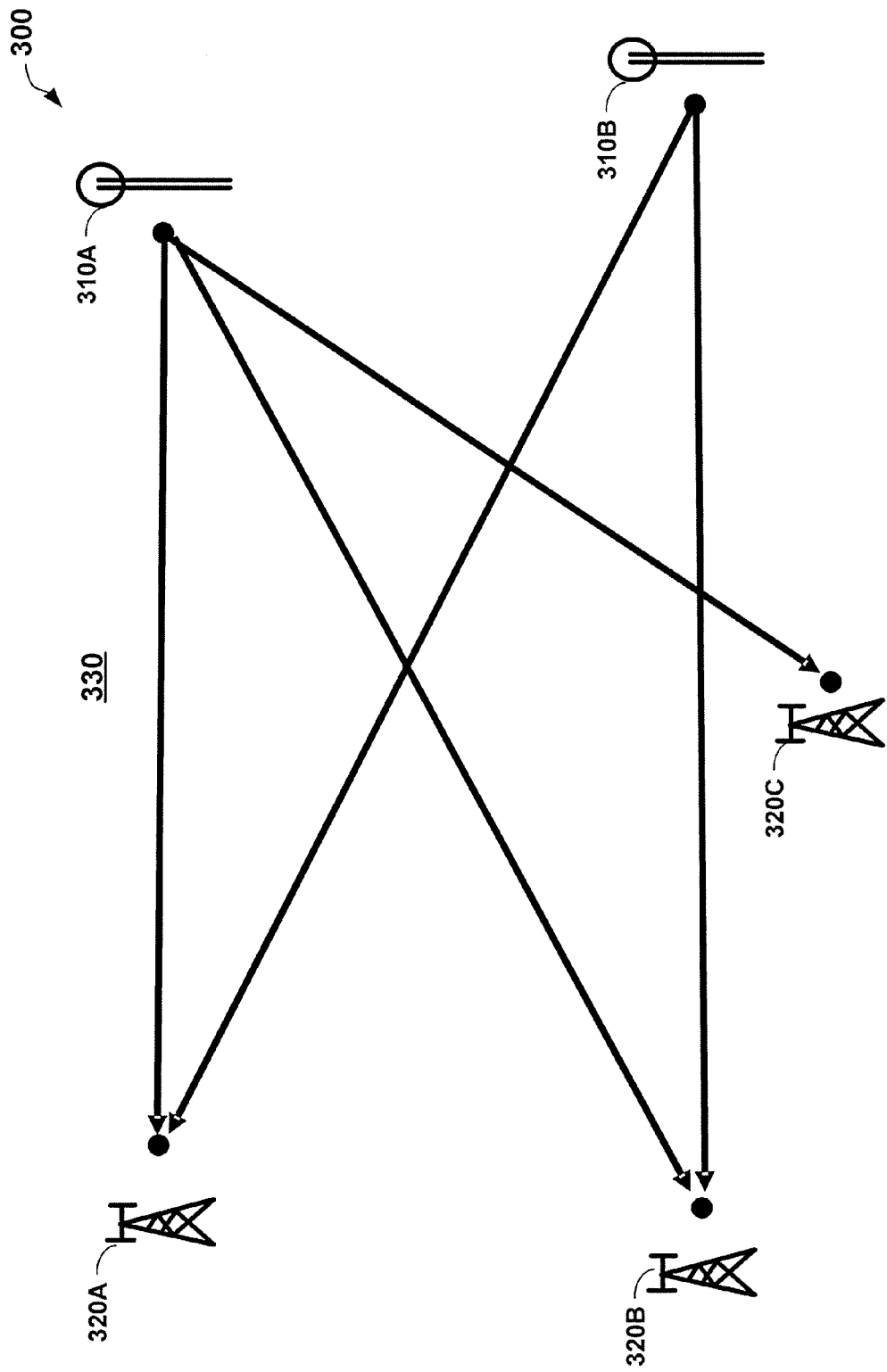
FIG. 3 is a diagram of an exemplary network of wireless signals or links in a geographic area (or region), in accordance with an embodiment.

FIG. 3 is a diagram of an exemplary network of wireless signals or links in a geographic area (or region) in accordance with an embodiment. As shown, in this example, there are two transmitters 310A-B which transmit wireless signals to three receivers 320A-C. The transmitters 310A-B and the receivers 320A-C can be stationary and can be configured to transmit or receive, respectively, radio or radio frequency (RF) signals to provide a plurality of signaling links or steady signals therebetween over a geographic area(s) 330.

The transmitters 310A-B may be any source capable of transmitting or passing along wireless signals, such as radio stations, etc. The receivers 320A-C may be any system, device or component capable of receiving and monitoring wireless signals or links. For example, the receivers 320A-C may be a network component of a telecommunications or mobile network (e.g., base station, LMU, or the like). These signals may be transmitted from different sources, of different radio frequencies or bands, etc. Line of sight between a transmitter and a receiver is not necessary (e.g., a signal can be reflected from a troposphere, a fixed and known structure, any intermediary or intervening system or device which reflects the signal, etc.). The receivers 320A-C may monitor or measure or ascertain one or more characteristics of received signals or links; may observe variations or changes of a characteristic of each of the received signals or links (e.g., degradation of a signal, errors, etc.) which reflect interference or interception of a particular signal or link by an object; and may associate or maintain time information as well as other related information for any such observation.

Figure 4:
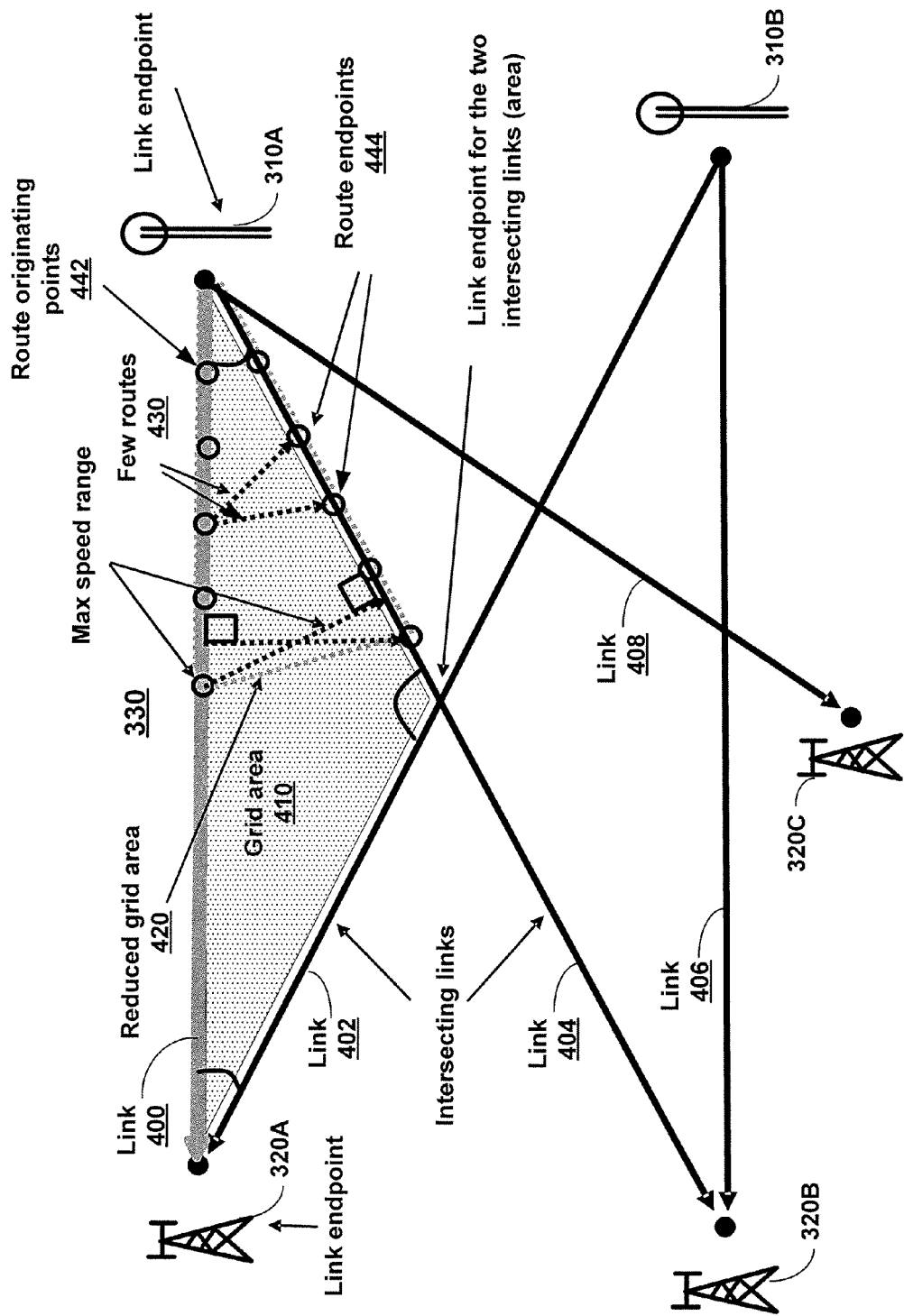
FIG. 4 is a diagram of an exemplary network of signals of FIG. 3 in which an exemplary grid(s) and process parameters are defined, in accordance with an embodiment.

As further shown in FIG. 4, the network of signals can be defined by for example a plurality of links 400, 402, 404, 406 and 408 between the transmitters 310A-B and receivers 320A-C. In this example, the receiving angle of each link as well as the location/path of the signals or links are predetermined, preconfigured, or known. The transmitters, receivers, and plural signals or links define link endpoints (e.g., at a transmitter, a receiver, an intersection between two or more links, etc.) and, accordingly, allow the geographic area 330 to be sub-divided in to sub-areas or grids. These sub-areas or grids (e.g., grid area 410) are bound, for example, by the path of the links and/or the location of the transmitters and receivers.

For instance, a grid area 410 can be defined by the links 400, 402 and 404, the transmitters 310A, 310B and the receivers 320A, 320B. If a first observation of an object interference occurs with link 400 (as shown), this link 400 can be considered an "active" link and it could be assumed that the object is at least in the grid area 410 (which can be considered an "active" grid) from at least an initial time ($t_1$) of the first observation until another observation of a subsequent interference of some signal or link by the object. If a subsequent observation of an object interference occurs at a time $t_2$ with link 404, then the grid area 410 can be further reduced to a reduced grid area 420 based on the second observation and expected locations can also be determined.

By way of example, an iterative approach can be used to calculate expected locations in an originating and terminating axis, e.g., first and second active link respectively. Any closed form equation would also be applicable as well. A maximum (Max) speed assumption can be used to form a vector, which is used in scoring the routes for example as follows:

Routes that are longer than vector are ignored;

Routes that are supported by vector are cumulating the likelihood of each route originating and terminating point;

It is up to a probability density function (PDF), assigned to each vector, how much weighting each point will have;

If routes of same length are terminating to different endpoints, the amount of terminating routes will make a difference in weighting (e.g., sum of probability mass will be bigger);

A uniform PDF assigns the same likelihood for each point, and custom PDFs can assign for example greater likelihood for midpoint ranges, and the maximum and minimum ranges are considered less likely, for instance; and There can be optional estimators for the expected value (weighted average, Hodges-Lehmann estimate, etc.).

Figure 5:
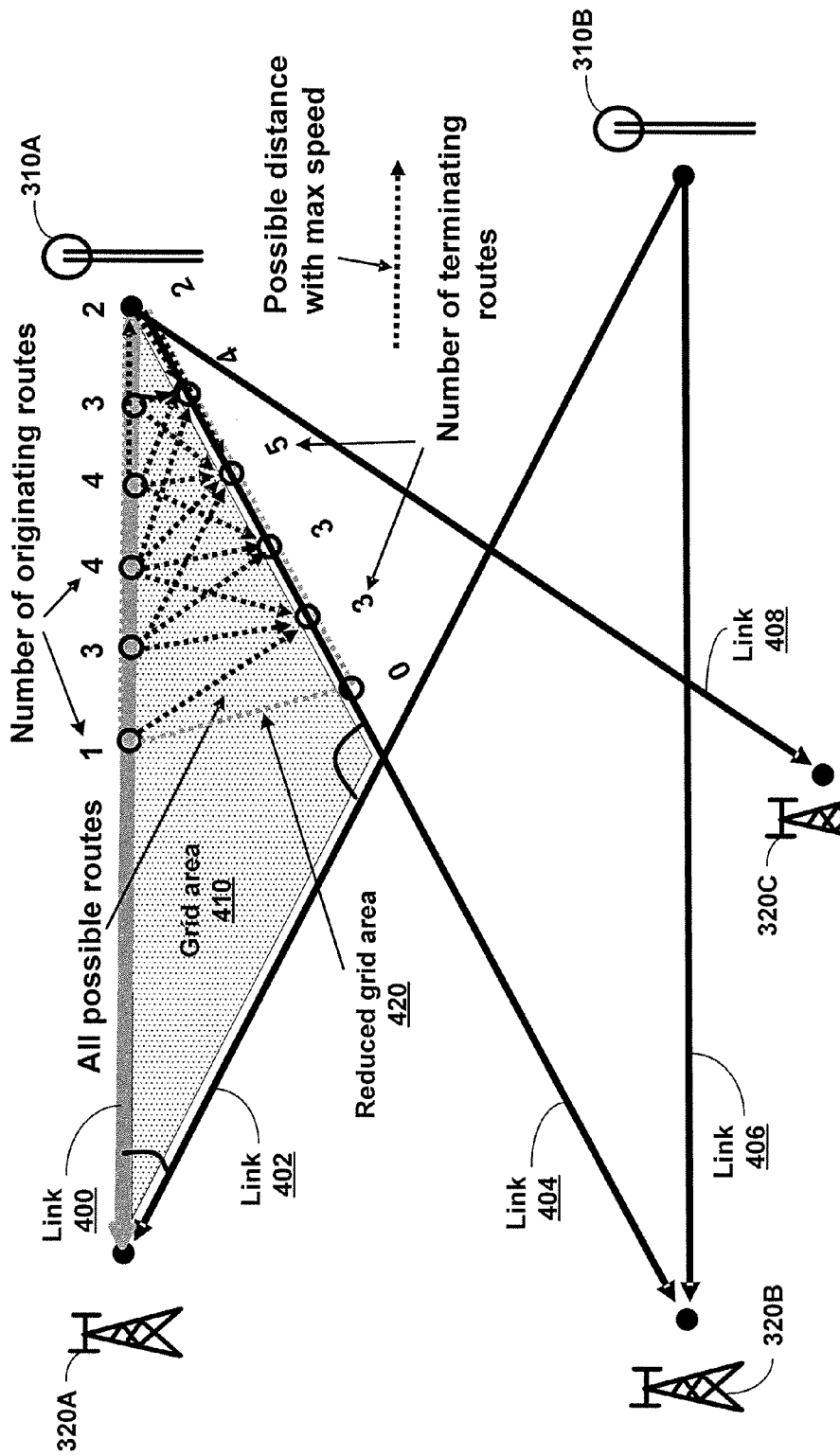
FIG. 5 is a diagram of an exemplary network of signals of FIG. 3 in which possible routes of an object (which intercepted or interfered with at least two particular signals or links) can be determined, in accordance with an embodiment.

Thus, for example, a number of possible routes with route originating points 442 and route terminating points 444 as shown in FIG. 4 can be determined within or to define this reduced grid area subject to a maximum speed. For example, as shown in FIG. 5, a number of possible originating points, terminating points and routes can be determined as well as the reduced grid area 420 according to maximum speed (or maximum speed vector). The maximum speed may be used to set at least the maximum possible distance from an originating route an object could travel given the two active links 400 and 404, and the time period between the two observations. The number of possible routes, either terminating or originating, can also be determined for each possible terminating and originating point, as shown.

Figure 6:
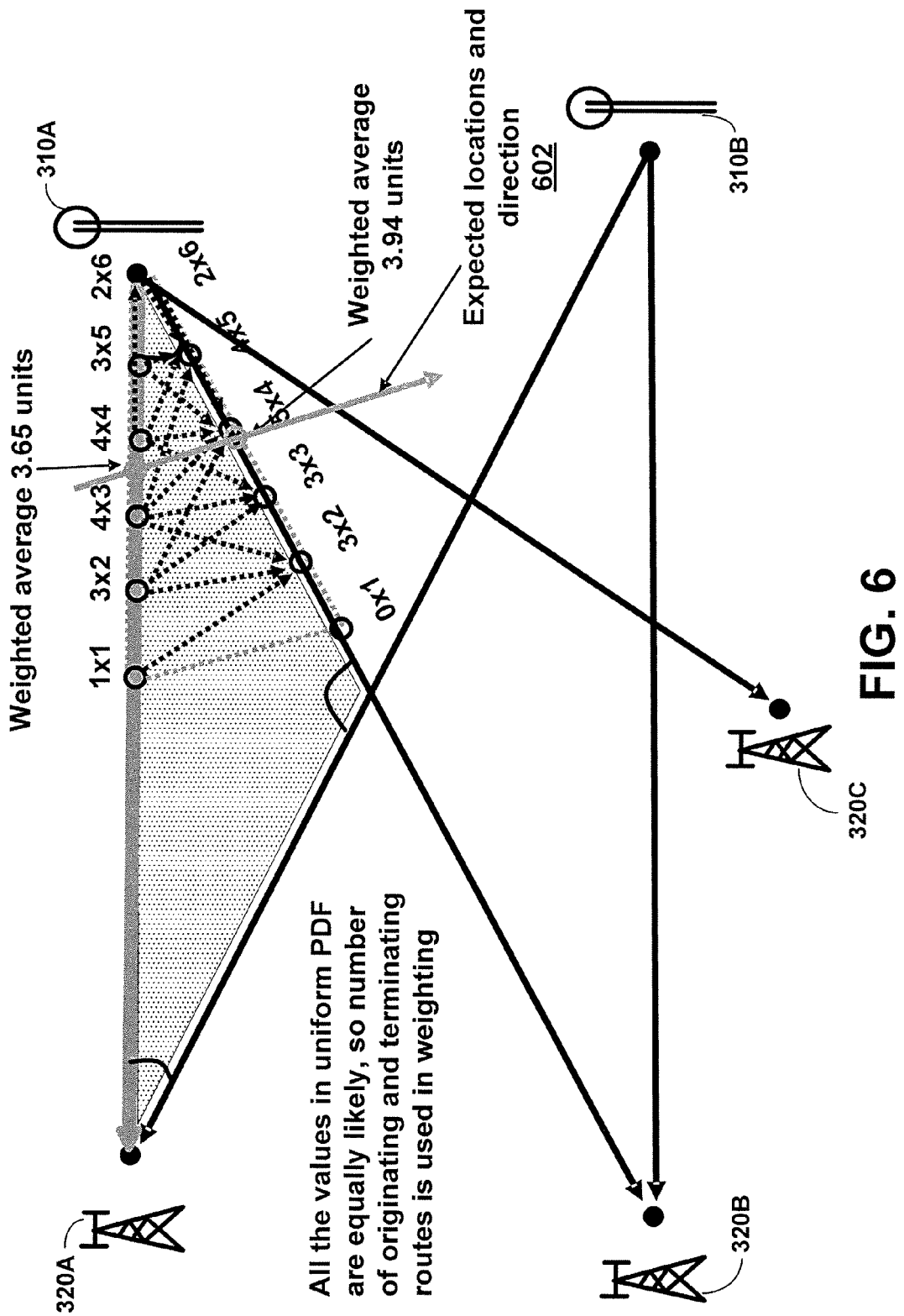
FIG. 6 is a diagram of an exemplary network of signals of FIG. 3 in which an expected location is determined or calculated using a uniform probability density function (PDF), in accordance with an embodiment.

As shown in FIG. 6, a probability density function (PDF), in this example a uniform PDF, can be used to apply a weight or weighted value to each of the possible route terminating and originating points. For instance, in this example, there are six possible originating points (e.g., i=1 to 6) in which the number of routes of each point is used in weighting P(i) since all the values in this uniform PDF are equally likely. Thus, the weighted average for the expected originating point can be: $((1 \times \text{SumP}(1) + 2 \times \text{SumP}(2) + 3 \times \text{SumP}(3) + 4 \times \text{SumP}(4) + 5 \times \text{SumP}(5) + 6 \times \text{SumP}(6))/(\text{SumP}(1) + \text{SumP}(2) + \text{SumP}(3) + \text{SumP}(4) + \text{SumP}(5) + \text{SumP}(6))) = ((1 \times 1 + 2 \times 3 + 3 \times 4 + 4 \times 4 + 5 \times 3 + 6 \times 2)/(1 + 3 + 4 + 4 + 3 + 2)) = 3.65$ units. Similarly, in this example, there are six possible terminating points (as shown) and, thus, the weighted average for the expected terminating point is 3.94 units. Based on these two expected locations, an expected route vector and its direction can be determined (e.g., the vector intersecting both expected locations). The expected locations and directions are shown by reference to numeral 602 in FIG. 6 of this example.

Figure 7:
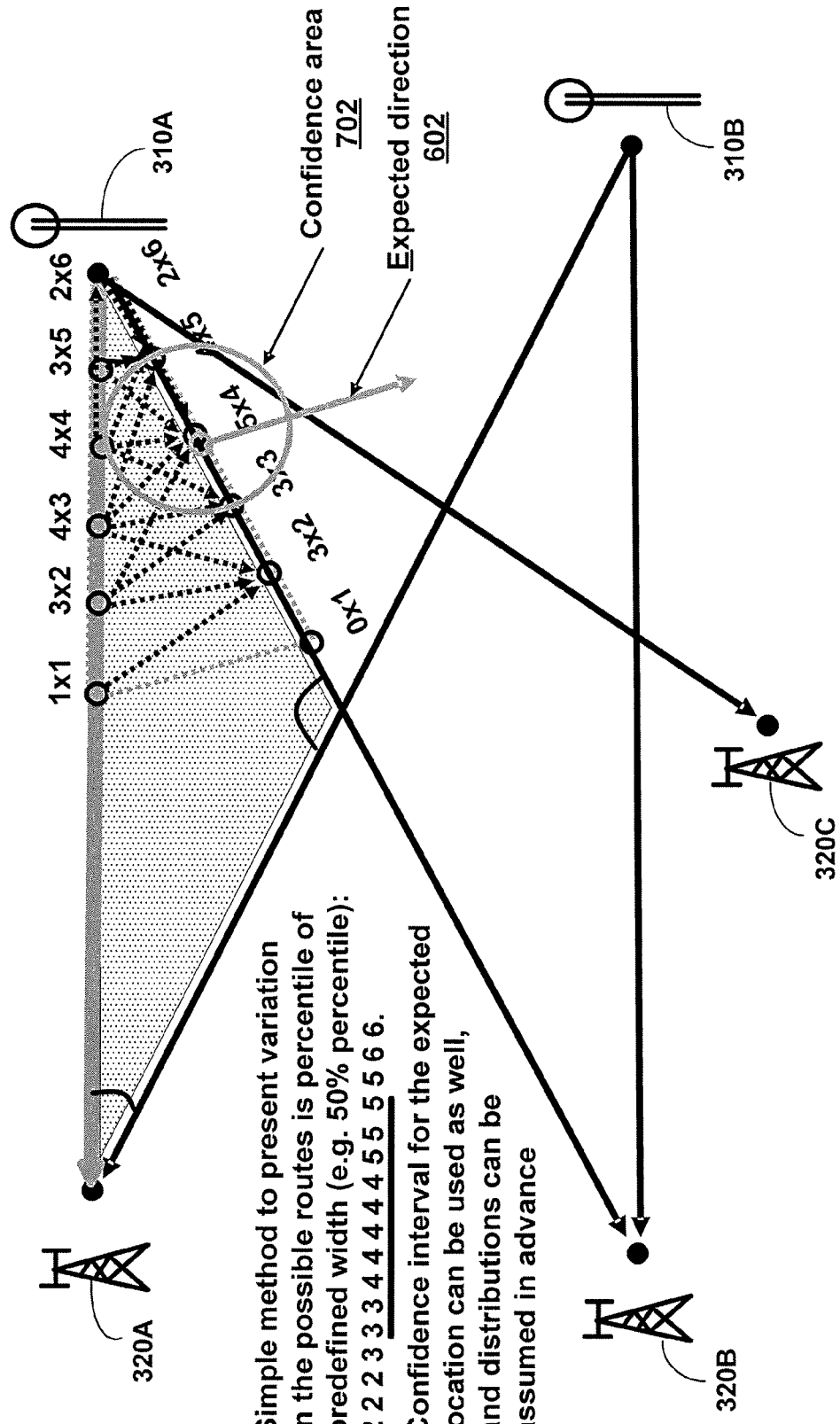
FIG. 7 is a diagram of an exemplary network of signals of FIG. 3 in which a confidence area is calculated using a uniform probability density function (PDF), in accordance with an embodiment.

For an expected terminating point and expected direction 602, a confidence area 702 can also be determined as shown in FIG. 7 in which a uniform PDF is employed. The confidence area or interval for the expected location (or route) can for example be a variation in the possible routes which is defined by X % percentile of a predefined width. In this example, as shown, the confidence area is the interquartile range (the middle 50% defined by $1^{st}$ and $3^{rd}$ quartile) of all possible route endpoints, e.g., 2, 2, 2, 3, [3, 3, 4, 4, 4, 4, 4, 5, 5, 5,] 5, 6, 6, 6 or locations. The confidence area can be calculated using different X values or percentile and taking into account other factors which may affect the determination of expected location/route.

Figure 8:
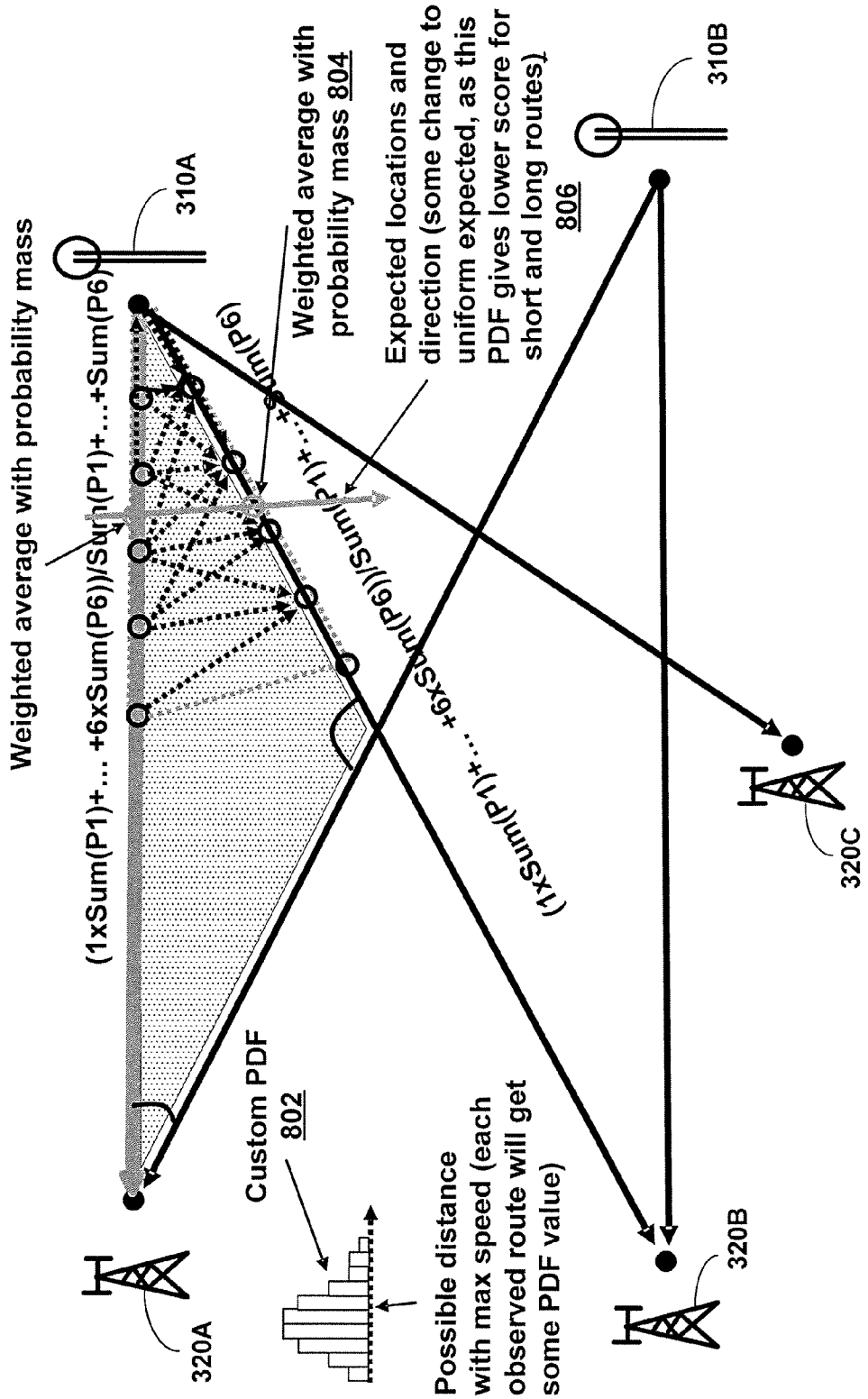
FIG. 8 is a diagram of an exemplary network of signals of FIG. 3 in which an expected location(s) is determined or calculated using a customized probability density function (PDF), in accordance with an embodiment.

Although the above describes a few examples employing the use of uniform PDFs, customized PDFs may also be employed. FIG. 8 is a diagram of an exemplary network of signals of FIG. 3 in which an expected location can be calculated using a customized PDF 802, in accordance with an embodiment. The PDF can be customized to take into account various factors, such as the length of a route. For instance, lower scores may be given for short and long routes with higher scores being given to mid-range routes. In this example with six originating or terminating points, the weighted average with probability mass for the expected originating or terminating point can likewise be calculated using the following formula:

$$((1 \times \text{SumP}(1) + 2 \times \text{SumP}(2) + 3 \times \text{SumP}(3) + 4 \times \text{SumP}(4) + 5 \times \text{SumP}(5) + 6 \times \text{SumP}(6))/(\text{SumP}(1) + \text{SumP}(2) + \text{SumP}(3) + \text{SumP}(4) + \text{SumP}(5) + \text{SumP}(6))).$$

The expected locations as well as the direction is shown by reference to numeral 806.

The above simply describes exemplary methodologies for determining expected locations and direction of an object at particular times or over particular times using, for example, a basic maximum speed criteria (e.g., speed and time of stimulus or observation of interference). Other models and approaches and criteria or assumptions can be employed to estimate or determine expected locations, directions, confidence area, etc. Further, when the object location service is used in conjunction with other primary or secondary location tracking technologies (e.g., radar, etc.), information already gathered on a tracked object (e.g., type of object, speed, direction, geographic area, etc.) may be provided to the object location service system or used with information gathered from the object location service system to track and determine expected locations, directions, presence and so forth of an object in a geographic area(s) or region(s) or to further customize and/or optimize calculations and assumptions used to determine these and other object-related information.

Furthermore, the network of signals shown in FIGS. 3-8 likewise is simply provided as an example. Any number of transmitters, receivers and signals or links therebetween may be employed and the locations of the transmitters and receivers and signals or links may be configured to provide different patterns of signals or links or grids and to provide different coverage over a geographic area(s) or region(s).

B. Operational Example

FIGS. 9-13 are diagrams of an exemplary network of signals of FIG. 3 showing an exemplary operational implementation of object location service. By way of example, the processes and functions of the object location service system or environment will be described from an initial interference observation or stimulus through subsequent interferences of signals or links, including determination of active signals or links or grids, of possible routes, of expected locations, confidence area, direction of movement, and tracing of the object, in accordance with an embodiment.

Figure 9:
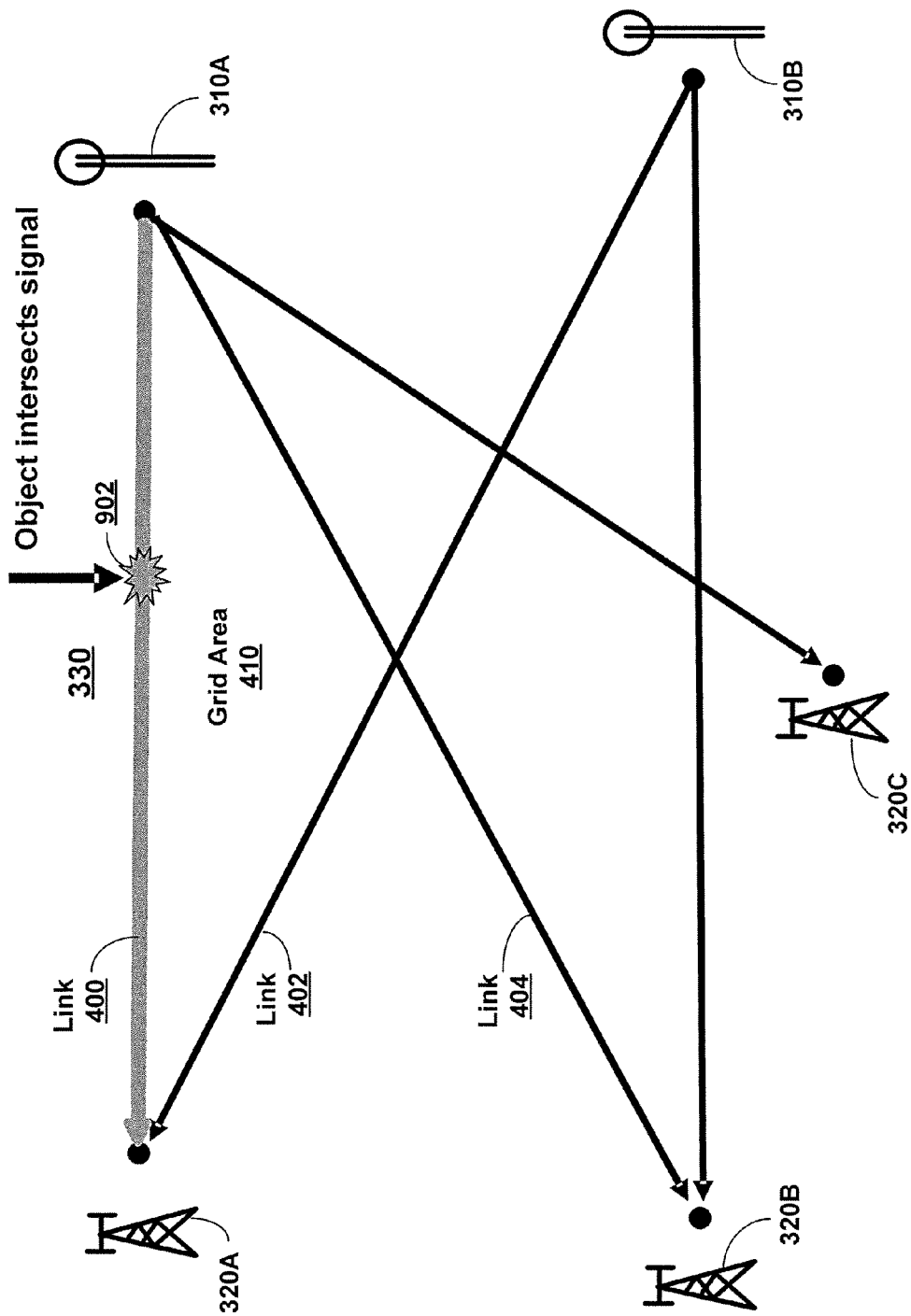
FIGS. 9-13 are diagrams of an exemplary network of signals of FIG. 3 showing an exemplary operational implementation of an object location service tracking a presence and movement of an object in a geographic area covered by the network of signals or links of FIG. 3, in accordance with an embodiment.
Figure 10:
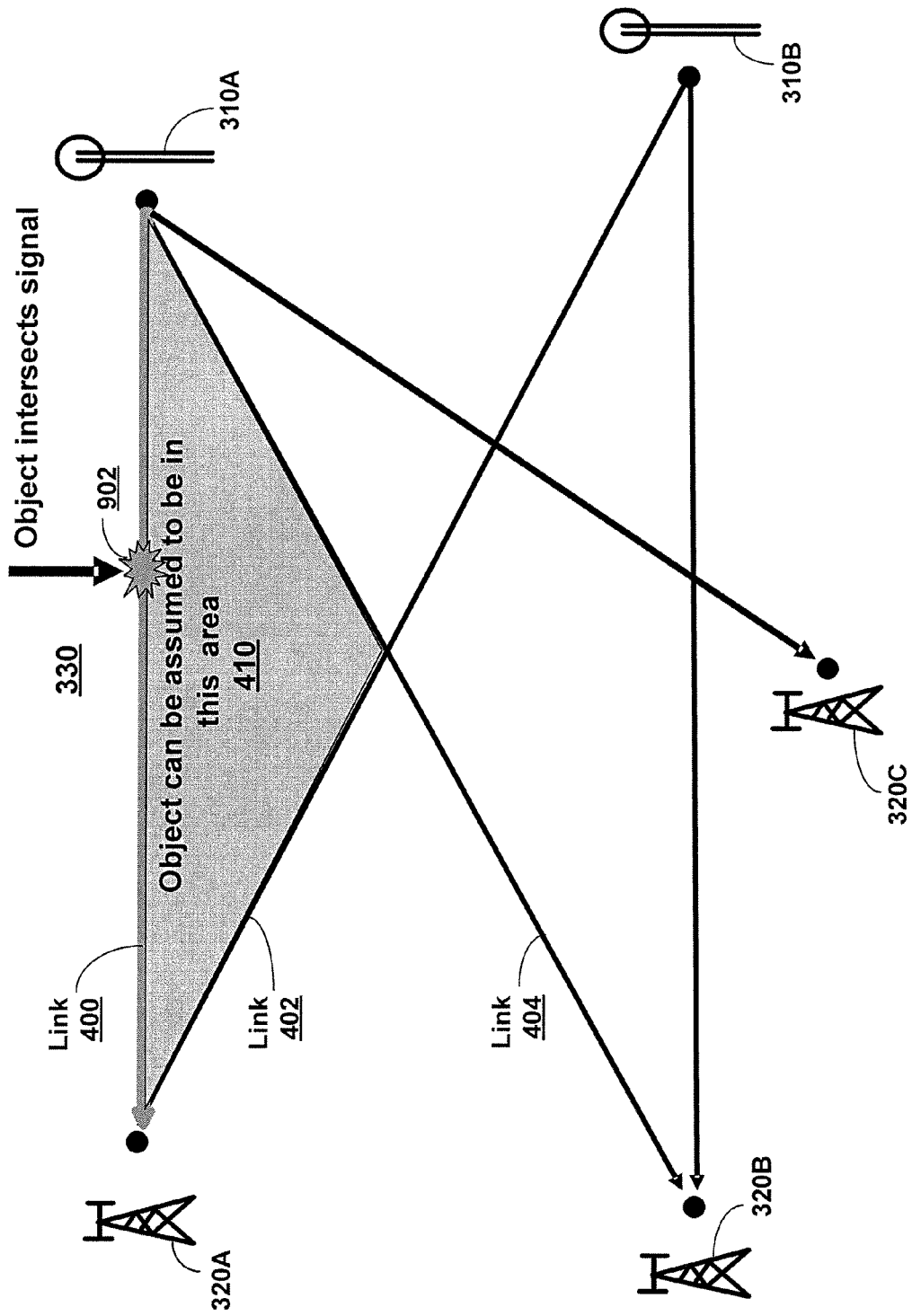

As shown in FIG. 9, a first or initial observation is made of an object interfering or intersecting the link 400 as shown by reference numeral 902. For instance, a characteristic of the link 400 is monitored and measured and a variation a characteristic of the link 400 is detected reflecting interference of the link by an object (e.g., fast or significant signal degradation, etc.) at a time t1. Such a determination can be determined by comparison (e.g., <, > and/or =, etc.) to some threshold or range for the particular characteristic and may take into account various traits unique to the particular link. Thus, the link 400 is active and the object can be assumed to be in the geographic area 330 or, more particularly, in the grid area 410 of this area as shown in FIG. 10.

At this point, the observed link activation event or instance can be saved along with a time information (e.g., a timestamp) reflecting the time of interference by the object. For the purpose of this examplary operational desciption, it will be presumed that this is the first observation or stimulus of the object within this network of signals. However, as will be described in further detail below, whether the observation or stimulus is an initial or subsequent one for an object may be ascertained by checking if the activated link is part of a previously activated grid area. If it is not part of a previously activated grid area, then it is likely that the observed event is a first observation of the object within the network of signals. Otherwise, the observation is likely one of an object already being tracked, and further tracking or tracing can be performed using this information, as noted below.

Figure 11:
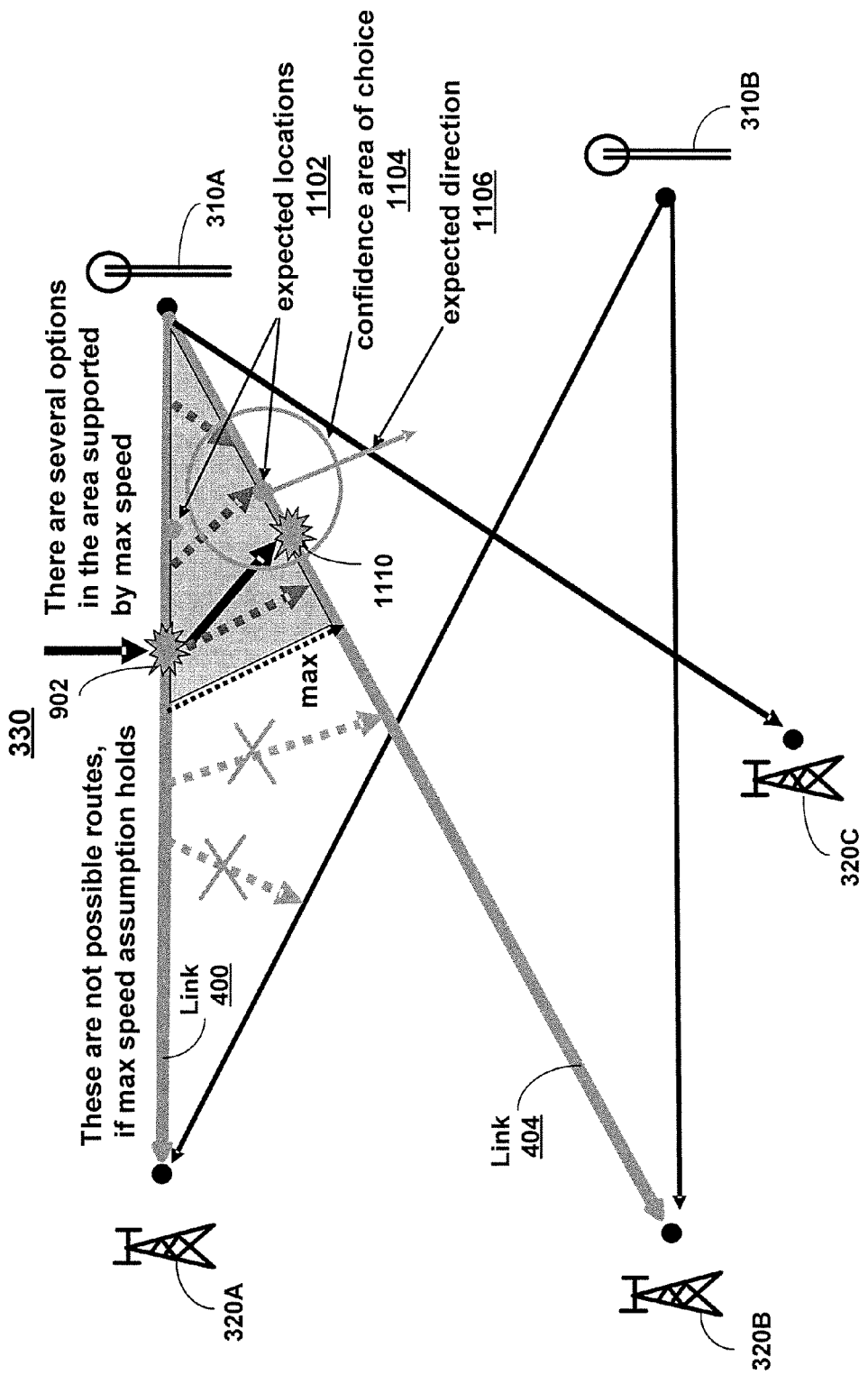

For a new or initial stimulus or observation, an active grid area 410 is formed with neighboring link information (e.g., what are the potential links activated next) and link monitoring continues. As shown in FIG. 11, a second stimulus or observation of an event or instance of interference is subsequently determined or detected of the object interfering or intercepting link 404 (which is now active) at some second time (t2). At this point, it is possible to determine the possible routes in the grid area 410 based on for example a maximum speed assumption and, accordingly, to reduce the grid area 410 and to determine expected locations 1102, confidence area of choice 1104 and expected direction 1106 such as in the manner described above with reference to FIGS. 3-8. This information or part of this information can be saved or observation records can be updated to reflect the new observation relating to the second stimulus.

Figure 12:
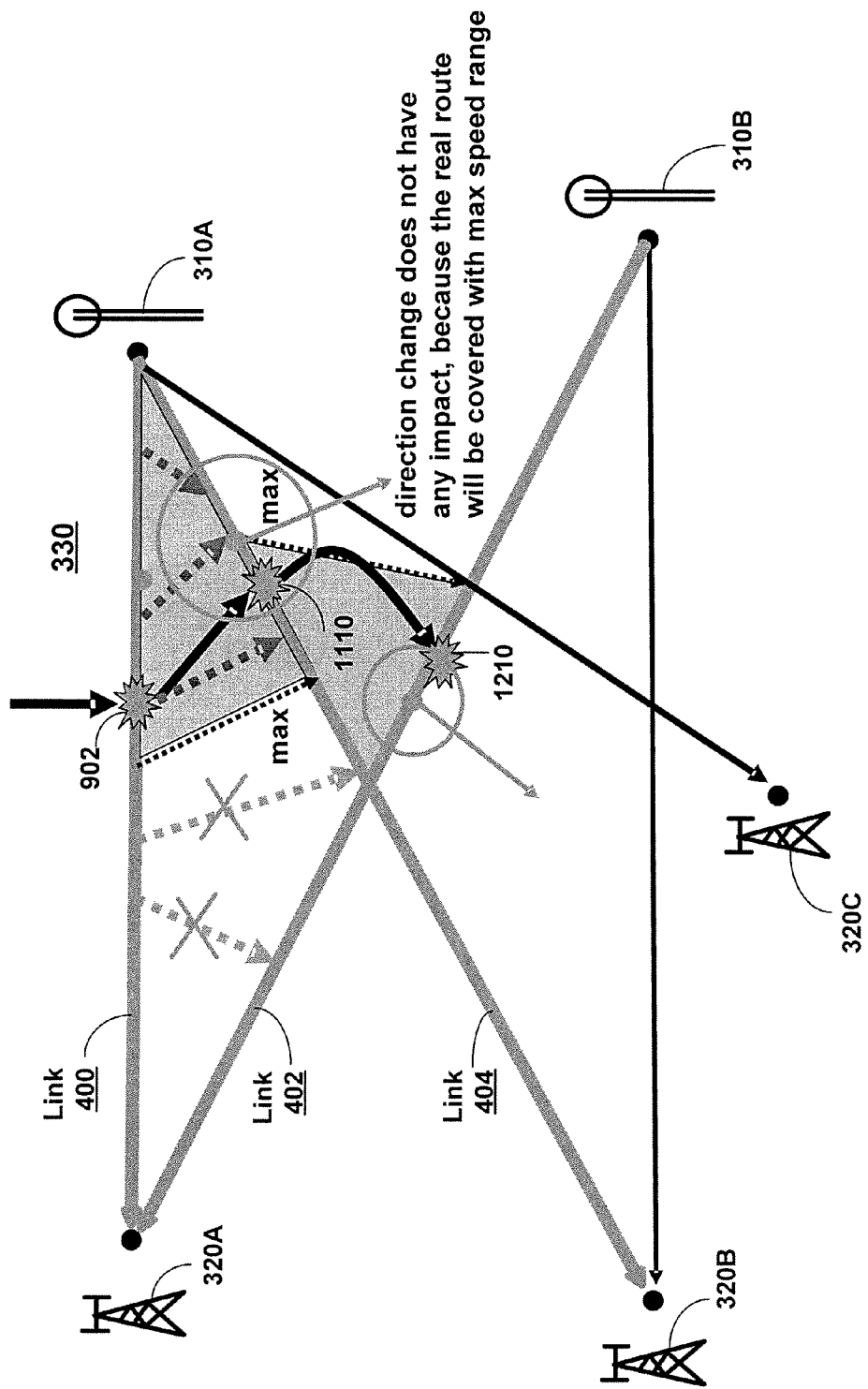

Subsequently, as shown in FIG. 12, a third stimulus or observation occurs with the determination or detection of the object interfering or intercepting link 402 (which is now active) with reference to numeral 1210 at a third time (t3). At this point, another grid area as well as a reduced grid area can be ascertained including possible routes, and object information can be updated to reflect new expected locations, confidence area, expected direction and so forth. This information or part of this information can be saved to reflect the new observation reflecting the third stimulus. As noted in the example of FIG. 12, the direction change of the object does not have any impact because the real route will be covered with the maximum speed range.

Figure 13:
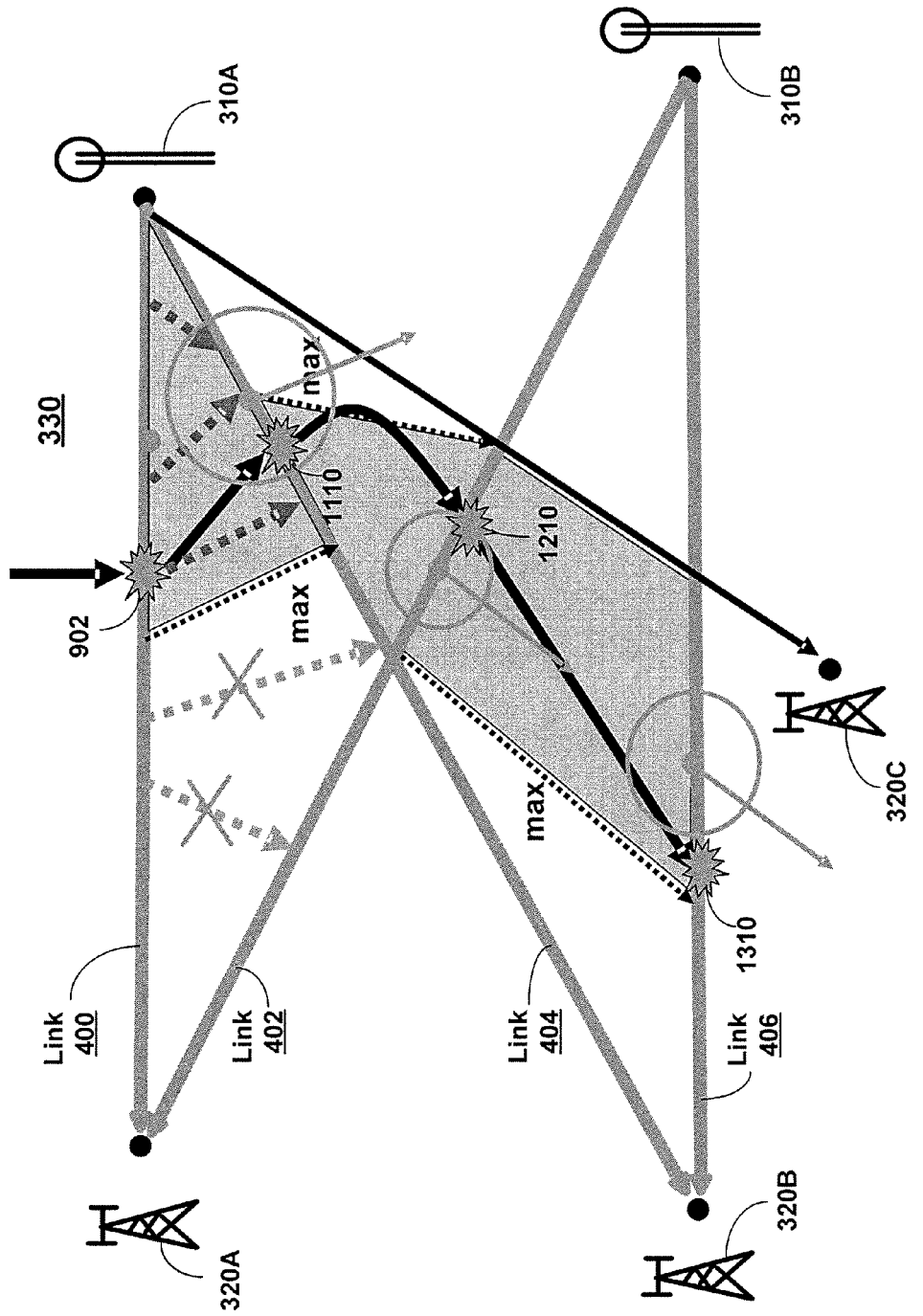

Finally, as shown in FIG. 13, a fourth or continued stimulus or observation occurs with the determination or detection of the object interfering or intercepting link 406 (which is now active) with reference to numeral 1310 at a fourth time (t4). Similarly, at this point, a grid area as well as a reduction of this grid area can be ascertained including possible routes, and object information can be updated to reflect new expected locations, confidence area, expected direction and so forth. This information or part of this information can be saved to reflect the new observation reflecting the fourth or continued stimulus.

Figure 14:
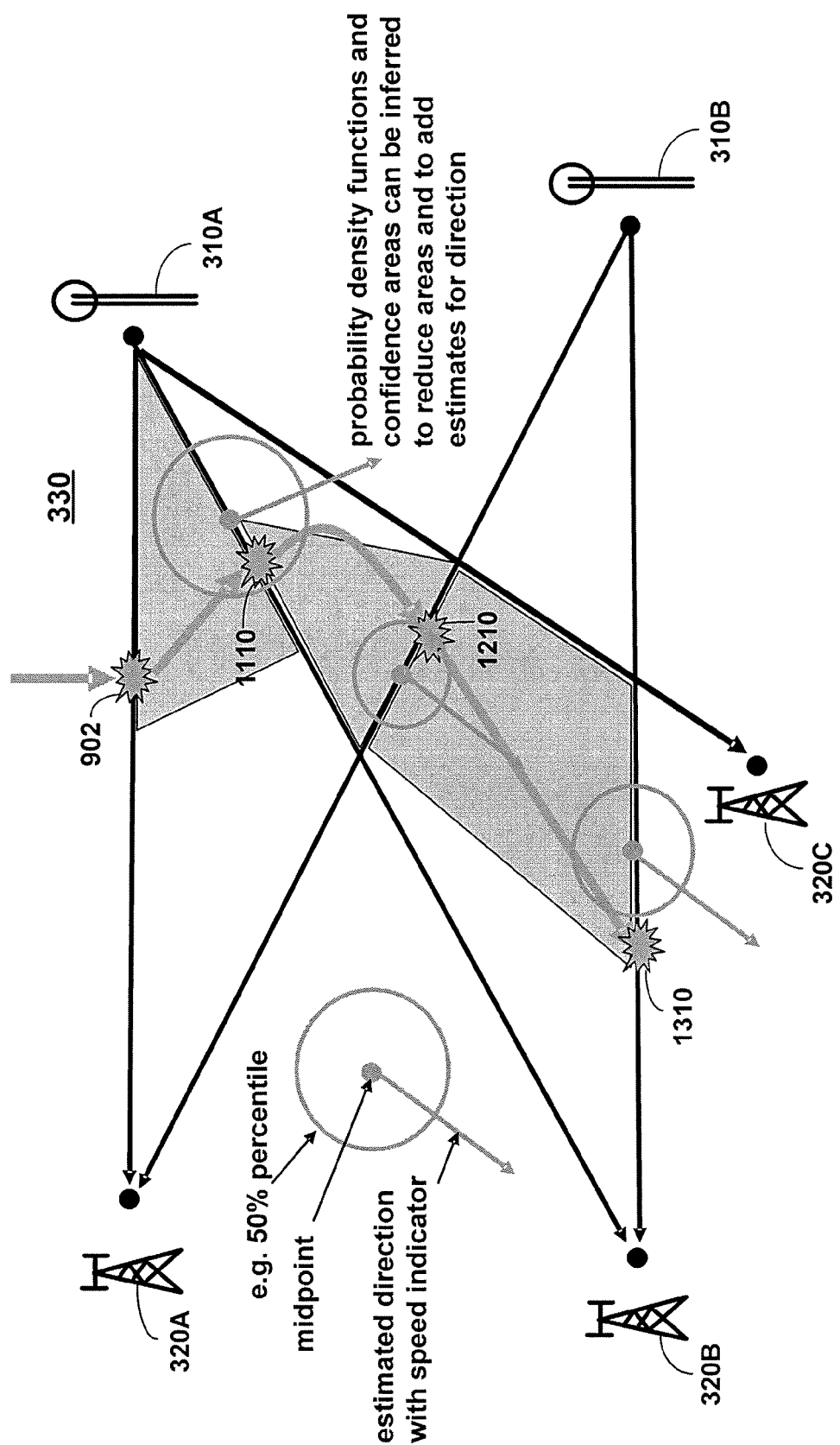
FIG. 14 is an exemplary operator display or view of an object's movement in a geographic area covered by the network of signals of FIG. 3, in accordance with an embodiment.

Throughout this exemplary operational implementation as described with reference to FIGS. 9-13, various information may be outputted (e.g., displayed) to an operator or the like to provide a real-time view or past or historical views or a combination thereof of one or more geographic areas or movement of any object in any of the geographic areas. For example, as shown in FIG. 14, there is an exemplary operator display or view of an object's movement in a geographic area covered by the network of signals of FIG. 3, in accordance with an embodiment. This display may be provided through a graphical user interface (GUI). It can be clearly appreciated that the GUI illustration contained in FIG. 14 of the MOSAIC representation of the processed output could additionally be simply morphed using its known fixed reference points as an overlay, to map or satellite image representation of the physical geographic area.

Various types of information may be displayed. For example, as shown, this information may include a map of the geographic area, each of the signals or links and their location, the transmitters and/or receivers, and any identified objects. Further, a display of the movement or trace of one or more objects moving through the geographic region may also be displayed, including any active or activated links (e.g., links 400, 404, 402 and 406), active or activated grids or reduced grids, expected locations of interferences (e.g., 902, 1110, 1210, 1310) and their associated times (t) reflecting the occurrence of such events, confidence area, expected direction for each expected location, and so forth.

For example, an operator in charge of controlling the airspace can see all the signal or link information if needed, but it is also possible to combine all information to image objects on the screen containing calculated confidence areas and estimate for direction. The estimated direction can be the linear of current and previous midpoint. Due to different areas in signal or linked networks, the confidence areas can vary as well. In a denser network, the estimated position can be very accurate. This information can be provided for third parties through some interface or interfacing system, such as for example, a GMLC interface or the like to transfer plain observations in real time. The object can also be displayed, as noted above, as an image representing monitored object (e.g. aircraft) on the screen, which may contain or have associated therewith supplementary information like speed, altitude or monitoring category.

Different display characteristics (e.g., width of lines, fonts, color, size, shape, flashing/blinking, etc.) may be employed to distinguish information associated with a particular object (such as when there are multiple objects) or associated with whether something is "active" or not, or to distinguish between different types of information (e.g., past vs. current information such as direction of the object). Furthermore, as desired, the types of information may be configured as desired. For example, a user can add or remove different items of information from the display (e.g., only show information for a particular object, highlight a trace for a particular object, remove/add confidence area information, etc.).

The display of FIG. 14 is simply provided as an example. The format or layout including the types of information may be modified or changed to provide desired information concerning a geographic area(s) or objects in any of these areas. Furthermore, a zooming-in or -out capability may also be provided to obtain the desired viewing area or resolution of information. Any of this information may also be made available to other parties or requesters.

III. Exemplary Processes

The exemplary processes of FIGS. 15, 16, 17A through 17H describe various exemplary functions and operations of an object location service according to various embodiments. These processes can be performed or distributed between the various systems, devices or components such as those shown in the exemplary environments of FIGS. 1 and 2 (e.g., a receiver, LMU, base station, location service system, information requester and so forth). These and other processes described herein can be embodied as program(s) or computer executable code stored or maintained on a tangible memory medium and which when executed by a computer (or processor) executes such processes.

Figure 15:
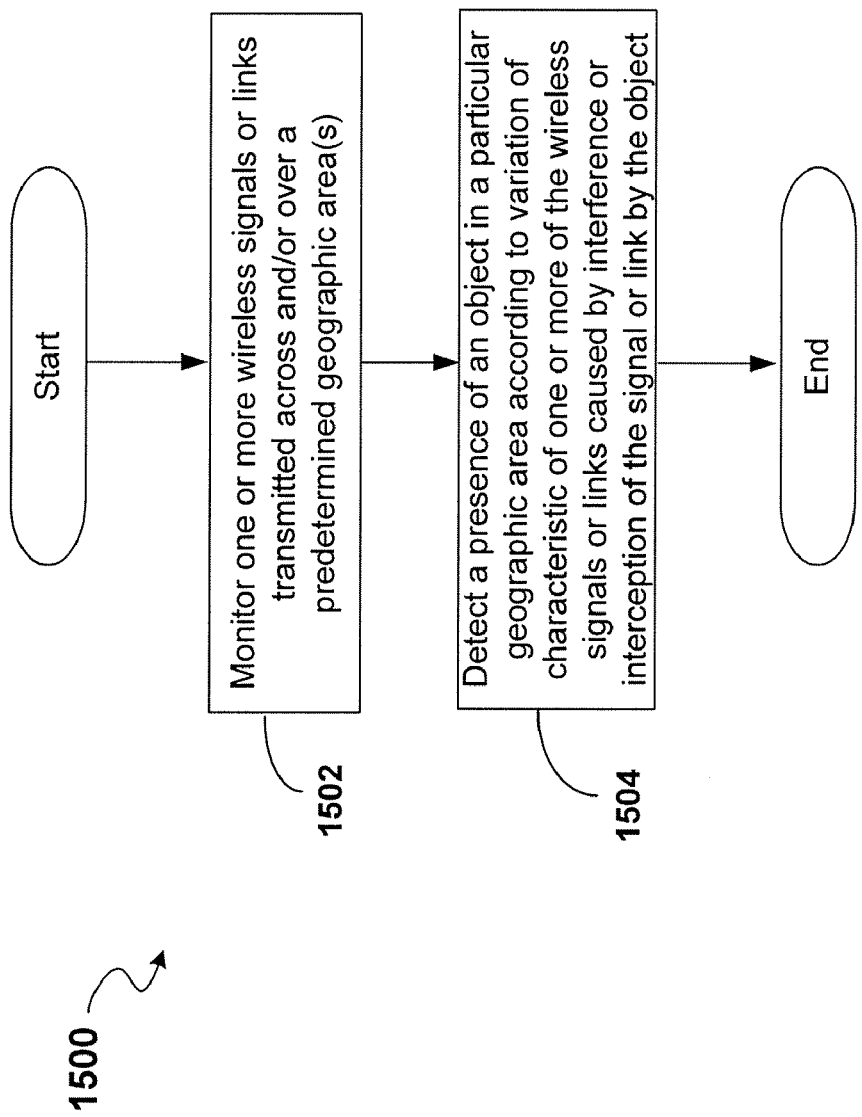
FIG. 15 illustrates a flowchart of an exemplary process of an object location service by which a presence of an object is detected in a geographic area, in accordance with an embodiment.

FIG. 15 illustrates a flowchart of an exemplary process 1500 of an object location service by which a presence of an object is determined or detected, in accordance with an embodiment. At step 1502, one or more signals or links of a network of signals are monitored. This may involve measuring one or more characteristics (or properties) of each of these signals or links, including for example signal strength. At step 1504, a presence of an object is detected in a particular geographic area according to a variation of a characteristic of a signal or link in that area. This variation of change reflects interference or interception of the signal or link by the object. For example, a characteristic of a particular signal or link is measured and is compared (e.g., >, < and/or =) to a threshold or range to determine the presence of an interfering object. By way of example, a fast degradation in the signal of link may reflect such a presence. Other characteristics may include for example a signaling error, increased error rate and so forth. Information related to this detected or observed event or instance or observation can be stored or saved for further processing or for distribution to other parties. For example, this information can include an identity of the active signal or link and the time of interference by an object as well as other measured or calculated or determined information.

Figure 16:
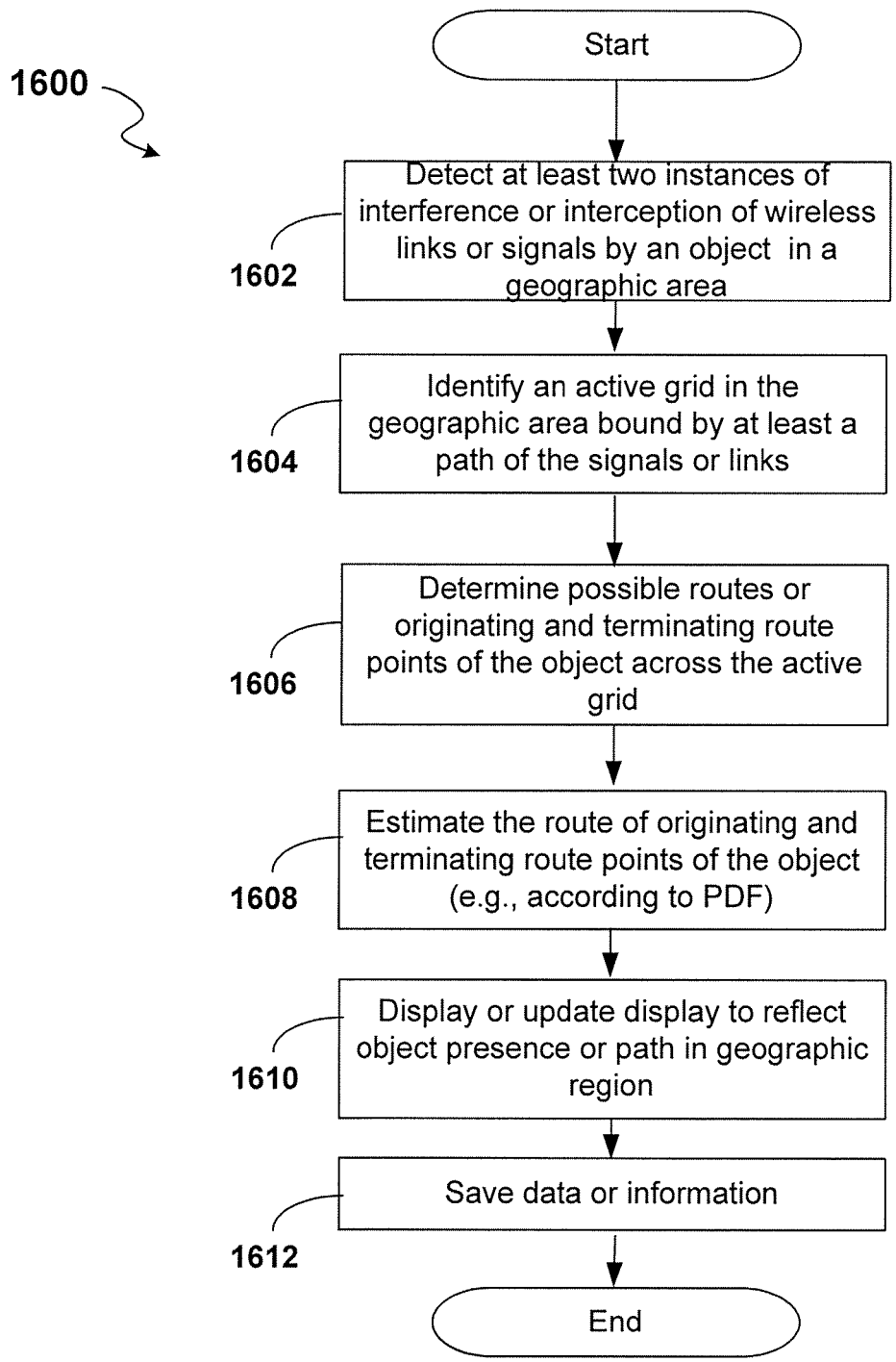
FIG. 16 illustrates a flowchart of an exemplary process of an object location service by which various information is determined relating to movement of an object in a geographic area, in accordance with an embodiment.
Figure 17A:
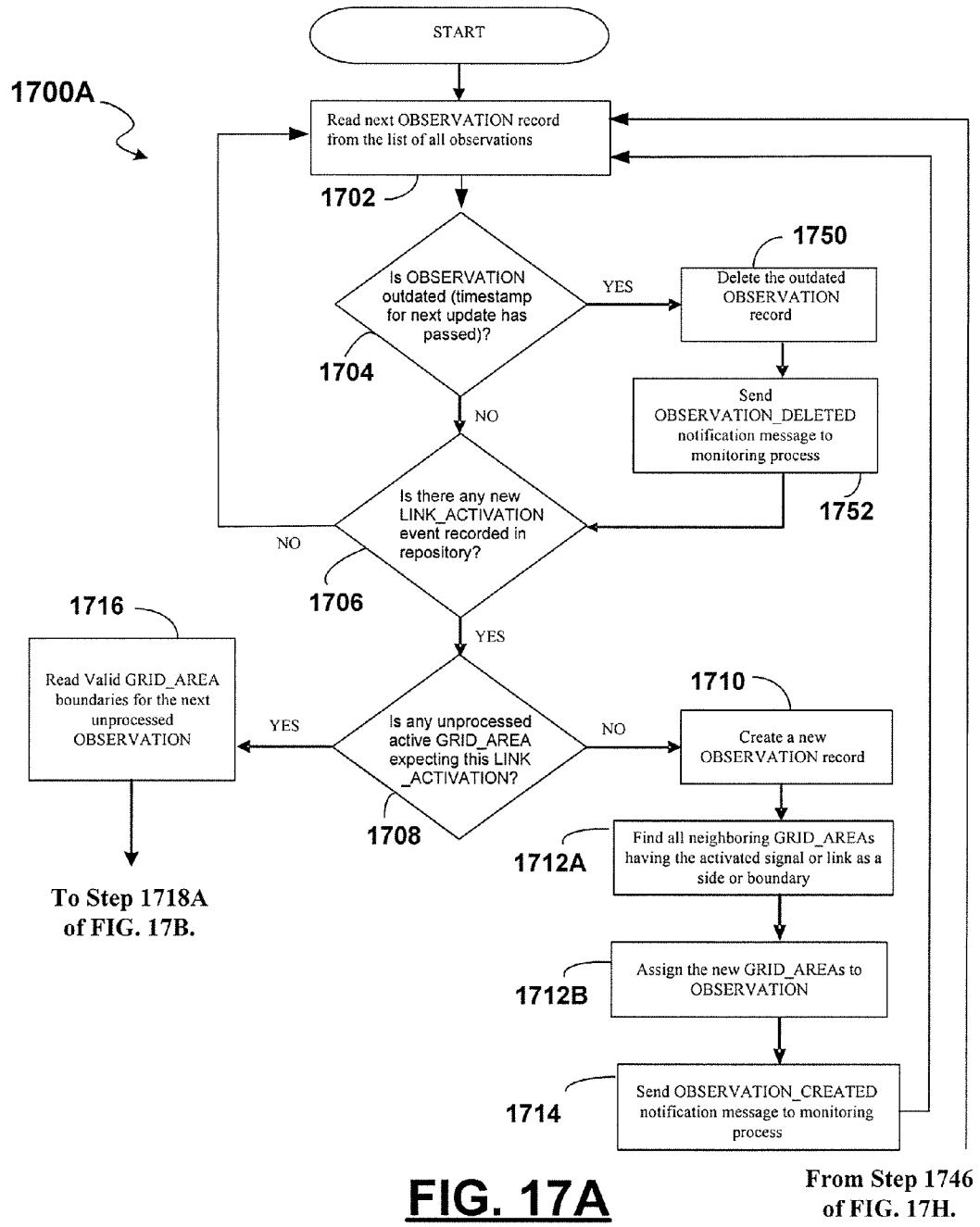
Figure 17B:
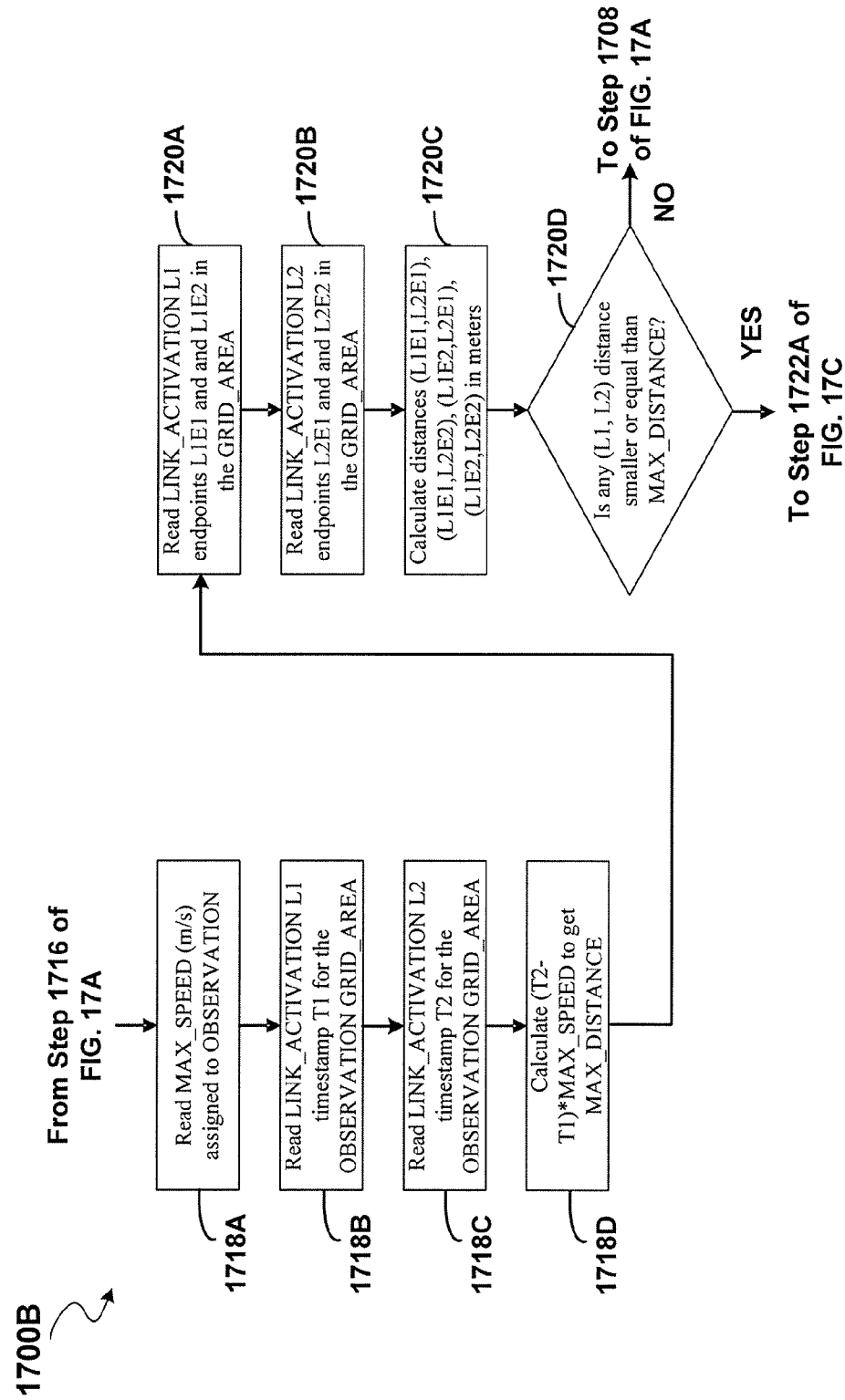
Figure 17D:
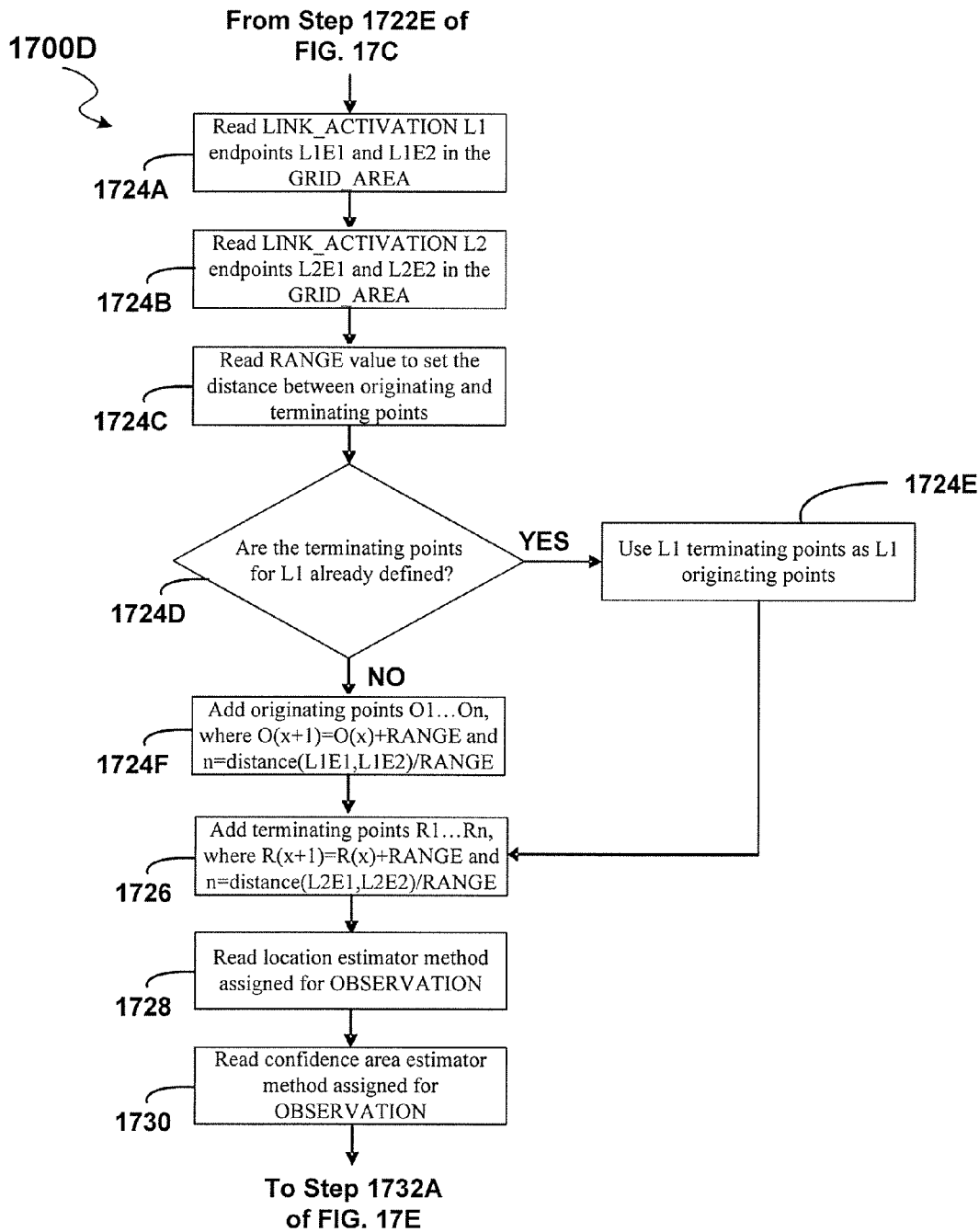
Figure 17E:
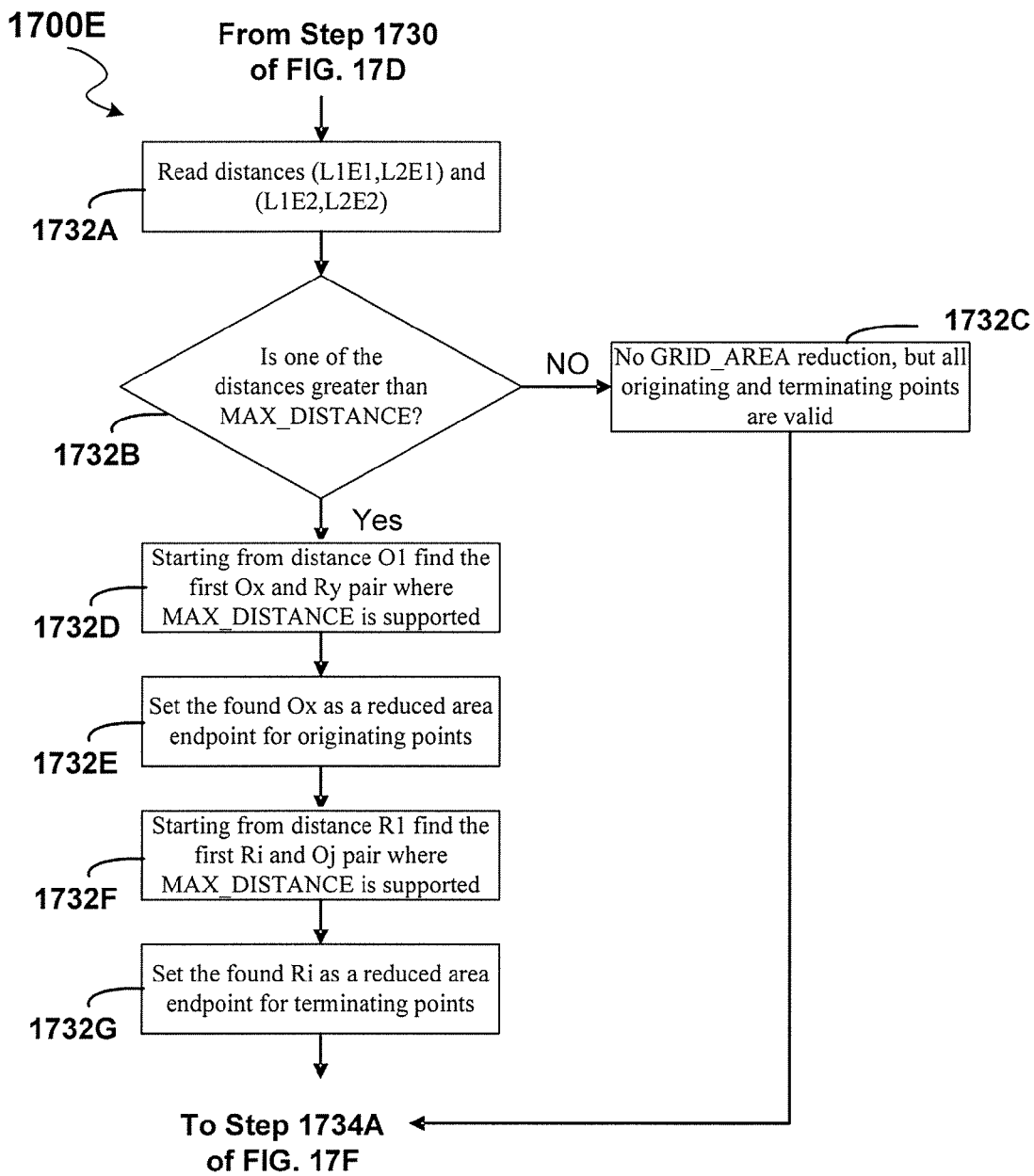
Figure 17F:
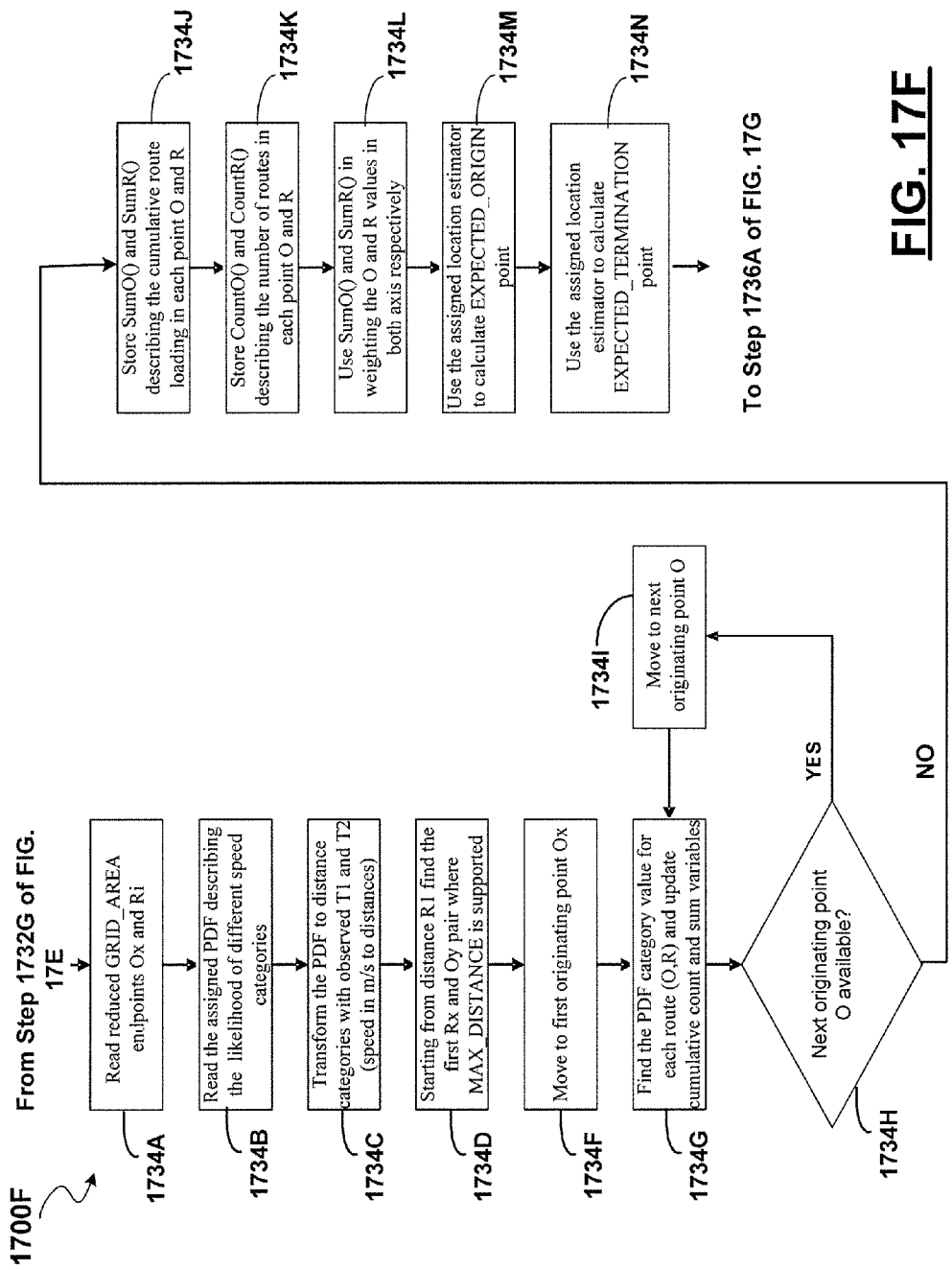

FIG. 16 illustrates a flowchart of an exemplary process 1600 of an object location service by which various types of information is determined and saved relating to movement of an object, in accordance with an embodiment. At step 1602, at least two instances or events of interference or interception of wireless signals or links (e.g., two same or different signals or links) by an object in a geographic area are detected or observed. At step 1604, an active grid (from a plurality of grids) bound by at least the paths of the signals or links is identified. This active grid can be for example a sub-area or -region of the geographic area delineated by for example the active signals or links, and/or signal transmission and/or reception positions and so forth.

At step 1606, the possible routes or originating and terminating route points of the object are determined for the active grid. The possible routes or points may be constrained by for example the particular active signals or links, the time or period of time between the two events or instances, as well as further by for example a maximum speed assumption or other assumptions pertaining to the object which may reduce the number or range of possibilities. As a result, the active grid area can also be reduced as well to for instance an active sub-grid.

At step 1608, the expected route and other object movement information can be determined or estimated based on the determined possible routes and/or possible originating or terminating points. This determination or estimation may involve for example the use of a probability density function (PDF) as applied for example to each possible route or each possible point. The PDF may be uniform or customized. Various types of PDFs may be employed to determine expected originating and terminating points, and a vector intersecting both points for example can be the expected route and direction. The speed can be assumed to be the maximum speed or determined based on the distance between the two expected points and the time such as a difference between the time of the two observed events or instances (e.g., speed or velocity=$\Delta$(distance)/$\Delta$(time)).

As discussed above, a confidence area or some standard of deviation may be determined with respect to an expected point such as the expected terminating point or the expected route. A simple measure of confidence area or deviation or variation may be a percentile of the possible routes or points, such as 50 percentile. Other measures of confidence area or deviation or variation may be employed.

At step 1610, this information concerning the object may be displayed or such a display may be updated (such as in real-time) to reflect the presence of an object or its movement and path within the network of signals or links in the geographic area. The current expected location of the object may be displayed as an image object with other distinguishing characteristics, and information such as described above with reference to FIG. 14 can be displayed.

At step 1612, any of this information also can be stored or saved, such as in association with the particular event or instance or observation, and made available to other parties. This information may be stored in database, list or an event queue, etc.

FIGS. 17A through 17H illustrate a flowchart of an exemplary process 1700 (shown as processes 1700A through H) of an object location service, in accordance with an embodiment. At step 1702, an observation record (or next record) is read from a list of observations (e.g., all observations or observations for a particular area of interest, etc.). At step 1704, a determination is made whether the observation associated with the record is outdated or stale. This may for example be the case if a time stamp or indication for the next update has elapsed. Other factors may also be considered in determining whether an observation is outdated or unnecessary. If outdated, the observation record is deleted or ignored at step 1750. A notification message to delete or indicating deletion of the observation record (e.g., OBSERVATION_DELETED) is sent to a monitoring process of the location monitoring service, at step 1752.

Otherwise, if the observation is not outdated, a determination is made whether there is any new event or instance of a signal or link being active (e.g., LINK_ACTIVATION), e.g., whether there is a signal or link activation event that is recorded or maintained in the repository or other available source at step 1706. An active signal or link may be determined based on for example a variation or change of a characteristic of the signal or link, e.g., a degradation of the signal or link or other characteristics reflecting interference or interception by some object. If not, the process 1700 proceeds back to step 1702 to read the next observation record.

If a new active signal or link is found or identified, a determination is made whether any unprocessed active grid area (e.g., GRID_AREA) is expecting this signal or link activation at step 1708. This allows a determination to be made on whether this new observation is for example a first or initial observation of an object in the geographic area or is a observation of an object already being tracked in this area. If this is a new observation, then a new observation record is created at step 1710. At steps 1712A and 1712B, all neighboring grid areas (e.g., GRID_AREAs) with the activated signal or link as a side or boundary are determined or found, and the new grid areas (e.g., GRID_AREAs) are assigned to this observation. At step 1714, a notification message to create or reflecting creation of an observation record (e.g., OBSERVATION_CREATED) is sent to the monitoring process. Thereafter, the process 1700 proceeds back to step 1702 to read the next observation record. These operations as noted above provides, for example, a process or subprocesses that can for example continuously evaluate and possibly clean up obsolete observation records, if there are no new activation events in the repository. A new link activation event can thus close the loop temporarily, and the focus of the process can move to the further evaluation of the new link activation.

If an unprocessed grid area is expecting this signal or link activation event (step 1708), then the valid boundaries of a grid area (e.g., GRID_AREA) are read for the next unprocessed observation at step 1716. At steps 1718A through 1718D, the maximum speed (e.g., MAX_SPEED) is read and a maximum distance (e.g., MAX_DISTANCE) is calculated according to the time or time stamps associated with the signal or link activation. For example, a maximum possible distance vector may be determined based on the speed and time. Specifically, for instance, at step 1718A, the maximum speed (e.g., MAX_SPEED) assigned to the observation is read or obtained. At steps 1718B and 1718C, time stamps T1 and T2 for activated signals or links (e.g., L1 and L2 respectively) of the observation grid area (e.g., GRID_AREA) are read or obtained. Finally, at step 1718D, the maximum distance (e.g., MAX_DISTANCE) can be determined for example with the following calculation, e.g., $d_{max}$(distance)= $\Delta t$(time)*$v_{max}$(speed)), or more specifically (T2−T1)* MAX_SPEED.

At steps 1720A through 1720D, a determination can be made whether the maximum distance is possible within the boundaries of the grid area. These boundaries can for example be defined by the signals or links (including the active ones), any intersection of such signals or links, transmission or reception points and so forth. If the maximum distance is not possible within the grid area, then the process 1700 proceeds back to step 1708 to ascertain if there are other unprocessed grid area/observations expecting this event or whether this activation event can now be considered a new observation.

Specifically, for example, at steps 1720A and 1720B, the signal or link activation L1 endpoints L1E1 and L1E2 in the grid area are read or obtained, and the signal or link activation L2 endpoints L2E1 and L2E2 in the grid area are also read or obtained. At step 1720C, the distances between these endpoints (e.g., (L1E1, L2E1), (L1E1, L2E2), (L1E2, L2E1), (L1E2, L2E2)) are calculated or determined. At step 1720C, a determination is made whether there is any (L1, L2) distances smaller or equal than the maximum distance. If not, the process 1700 proceeds back to step 1708.

Otherwise, if the maximum distance is possible with the grid area boundaries, then the process 1700 proceeds to steps 1722A through 1722E. At step 1722A, the signal or link activation L2 endpoints L2E1 and L2E2 in the active grid area are read or obtained. At step 1722B, a neighboring grid area is found, determined or identified having the same endpoints L2E1 and L2E2 as a side or boundary or the like. At step 1722C, a determination is made whether a new neighboring grid area is found, determined or identified. If not, the new grid area is set as missing for the observation at step 1722D. Otherwise, if so, the new grid area is assigned to the observation at step 1722E. In either case of steps 1722D or 1722E, the process 1700 thereafter proceeds to step 1724A.

At steps 1724A through 1724F, originating points (predefined range determines the range between any $point_n$ and $point_{n+1}$) can be assigned for previously activated signal or link (if missing). For example, at step 1724A and 1724B, the endpoints L1E1 and L1E2 and L2E1 and L2E2 of the grid area are read or obtained for each signal or link activation L1 and L2 respectively. At step 1724C, a range value (e.g., RANGE) is read or obtained to set the distance between originating and terminating points.

At step 1724D, a determination is made on whether the terminating points for the signal or link activation L1 is defined. If so, the signal or link activation L1's terminating points are used as its originating points at step 1724E. If not, at step 1724F originating points are added, e.g., O1 . . . On, where O(x+1)=O(x)+RANGE and n=distance (L1E1, L1E2)/ RANGE. In either case, the process 1700 then proceeds to step 1726 in which the terminating points (predefined range determines the range between any $point_n$ and $point_{n+1}$) are assigned for the latest activated signal or link. For example, the terminating points can be added, e.g., R1 . . . Rn, where R(x+1)=R(x)+RANGE and n=distance(L2E1, L2E2)/ RANGE. The use of predefined range(s) can for example allow control of the amount of originating and terminating points in the iterative approach, when for instance small ranges between points result in large amount of routes, and any larger range reduces the amount respectively.

At step, 1728, a location estimator method to be applied for this observation is read or obtained. At step 1730, a confidence area estimator to be applied for this observation is read or obtained.

At steps 1732A through 1732G, a reduced grid area (e.g., GRID_AREA) is calculated or determined, if applicable, according to one or more constraints or criteria, such as the maximum distance (e.g., MAX_DISTANCE). For example, the ranges in both link axes and assigned originating and terminating points are applied. An angle can also be read from grid area records, and the possible originating-terminating points are traversed or evaluated (e.g. cosine law applied to check first points meeting the max speed route). The same can be repeated for terminating-originating direction. In this way, for example, an area, grid or boundary can be reduced in view of for example previously discovered points.

Specifically, for example, at step 1732A the distances of (L1E1, L2E1) and (L1E2, L2E2) are read or obtained. At step 1732B, a determination is made on whether one of the distances is greater than the maximum distance (e.g., MAX_DISTANCE). If not, no grid area reduction is performed, and all originating and terminating points may be considered valid at step 1732C. The process 1700 then proceeds to step 1734A (described below).

If one of the distances is greater than the maximum distance, then starting from distance O1 a first Ox and Ry pair is sought where maximum distance is supported at step 1732D. At step 1732E, the found Ox is set as the reduced area endpoint for originating points. At step 1732F, starting from distance R1, the first Ri and Oj is sought where the maximum distance (e.g., MAX_DISTANCE) is supported. At step 1732G, the found Ri is set as the reduced area endpoint for the terminating points.

At steps 1734A through 1734N, the route combinations for endpoints (e.g., all of such combinations) can be formed and expected locations, such as originating and terminating locations, can be calculated using a PDF, e.g., uniform or customized. For example, at step 1734A, the reduced grid area endpoints Ox and Ri (or endpoints in general if not reduced) are read or obtained. At step 1734B, the assigned PDF describing for instance the likelihood of different speed categories is read or obtained. At step 1734C, the PDF is transformed to distance categories with observed T1 and T2 (e.g., speed in m/s or the like to distances). At step 1734D, the first Rx and Oy pair is sought starting from distance R1 and where the maximum distance (e.g., MAX_DISTANCE) is supported. At step 1734F, the process 1700 moves to the first originating point Ox. At step 1734G, the PDF category value is sought for each route (O, R) and the cumulative count and sum variables are updated. At step 1734G, a determination is made as to whether the next originating point O is available. If so, the process 1700 moves to the next originating point O at step 1734I and then proceeds back to step 1734G.

Otherwise, if the next originating point is not available, the SumO( ) and SumR( ) describing the cumulative routes loading in each point O and R are stored at step 1734J. At step 1734K, the CountO( ) and CountR( ) describing the number of routes in each point O and R are stored. At step 1734L, the SumO( ) and SumR( ) are used in weighting the O and R values in both axis respectively. At step 1734M, the assigned location estimator is used to calculate the expected originating point (e.g., EXPECTED_ORIGIN point). At step 1734N, the assigned location estimator is used to calculate the expected terminating point (e.g., EXPECTED_TERMINATION point).

At steps 1736A through 1736D, the confidence area can be calculated with the assigned estimator. For example, at step 1736A, the CountR( ) is read or obtained for all the terminating points R. At step 1736B, a value vector is formed where the values R have the frequency as defined in CountR( ). At step 1736C, the $1^{st}$ and $2^{nd}$ percentile value assigned for the observation is read or obtained. At step 1736D, the $1^{st}$ and $2^{nd}$ percentile values are calculated for value vector R with the assigned estimator.

At steps 1738A and 1738B, the expected direction can be calculated by utilizing the expected originating and terminating locations. A vector may be drawn intersecting these two locations in the direction from the originating to the terminating location. For example, in step 1738A, the expected originating point (e.g., EXPECTED_ORIGIN point) and expected terminating point (e.g., EXPECTED_TERMINATION point) are read or obtained. At step 1738B, the expected direction (e.g., EXPECTED_DIRECTION) is determined for example by utilizing trigonometric functions in X-Y space.

At steps 1740A through 1740E, a predefined expiry timestamp or the like can be assigned to this observation, or a timestamp is calculated with minimum speed (e.g., MIN_SPEED). For example, at step 1740A, a determination is made whether a predefined expiry period TE is defined. If so, the process 1700 proceeds to step 1740E described below. If TE is not defined, then the most distant signal or link endpoint is sought for signal or link endpoints L2E1 or L2E2 in the grid area (e.g., GRID_AREA) at step 1740B. At step 1740C, the minimum speed (e.g., MIN_SPEED) assigned to the observation is read or obtained. At step 1740D, the time required to travel between distant endpoints is calculated as TE. At step 1740E, the expiry time stamp, e.g., T2+TE, is assigned to the observation.

At step 1742, the observation or record thereof is updated for all the new estimates and criteria or constraints. At step 1744, a notification message to update or reflecting update of an observation record (e.g., OBSERVATION_UPDATED) is sent to the monitoring process.

At step 1746, a determination is made whether to continue the observation process. If so, the process 1700 proceeds back to step 1702 (of FIG. 17A) to read the next observation record from the list of observations Otherwise, if not, the history of observations or the records (e.g., OBSERVATION_HISTORY) are saved and active records can also be cleaned up.

Throughout this process, observation information whether measured, calculated, determined or estimated can be outputted (e.g., displayed) and updated accordingly. This output or display may for example include information or take the form of the example shown and described with reference to FIG. 14.

Further, as shown by exemplary process 1700, multiple competing calculations can take place at the same time. It is possible to apply iterative methods and combine them with closed form equations of choice, and to define different observation profiles with default speed PDF and location estimators. Information can be cumulating all the time, so it is possible to combine likelihood estimates to refine location estimates (e.g. a priori and posteriori probabilities and conditional probability). These may all be based on the route sample and what is assumed of observation (e.g., the only empiric data is activation of link). It is possible to refine assumptions if continuous link records show better fit for alternative observation profile (e.g., a jet is changed to helicopter after finding better fit with speed PDF).

The above processes, e.g., 1500, 1600 and 1700 (i.e., 1700A through H), are simply exemplary processes and their functions and operations may be modified to include, omit or change or re-arrange any of the various steps or distribute the various operations between various systems, devices or components such as those discussed above with reference to FIGS. 1 and 2. The manner in which information is maintained or accessed or processed whether as one record or a plurality of records or a list of records or a queue of events, etc. as well as the format and labeling or the different types of data or information may be modified or changed as desired to implement the object location services described herein.

IV. Exemplary System or Device

FIG. 18 is a block diagram showing exemplary components for a device or system (or component) 1800, such as a receiver, transmitter, location service system, information requester, etc. These devices or systems may include, in general, one or more processor(s) and/or processing circuit(s), memory, wireless receiver and/or transmitter, operating system or applications, input device(s), output device(s) and/or other communications subsystem and interfaces, in accordance with an embodiment.

By way of example, as shown, such a system 1800 may having one or more processor(s) 1810, a memory 1820, input device(s) 1840, output device(s) 1830, a communications system 1802, connected across one or more buses 1860. In addition, each of these components is coupled to a power source, such as a fixed power source or a rechargeable battery (not shown).

The processor(s) 1810 control the various operations and functions of the system 1800, including the general operation of the system as well as implementation of functions and operations associated with the object location service described herein and above. The processor(s) 1810 may include one or more microprocessors that are each capable of executing software instructions or computer executable code stored in memory 1820.

The memory 1820 may include random access memory (RAM), read only memory (ROM), and/or flash memory or other tangible memory medium, and stores information in the form of data and software components. These software components include instructions or code that can be executed by the processor(s) 1810, such as to perform the various features described herein. Various types of software components may be stored in the memory 1820. For instance, the memory 1820 may store software components that control the operation of components of the system 1800, such as the communications system 1802, input device(s) 1840, and output device(s) 1830 and so forth.

In one aspect, the memory 1820 may also store data and software components that manage or facilitate management or control of the gathering, monitoring, detection, storage of events or instances related to interfering object for an object location service, such as generally described herein. These components may include location service application or engine 1822, object profile and data 1824 (e.g., information including for example functions or variable or constraints or equations used to customize the observation application and the processes described herein for a particular type of object such as a plane, jet, helicopter, etc.) and event or instance database 1826 for storing observed events or instances such as information pertaining to an occurrence of an interference or interception of a wireless signal or link. Each event or instance may contain information such as the particular wireless signal or link or its identity or path, a time at which interference or interception occurred, the receiving angle of the signal, the amount of variation of a characteristic of the signal (e.g., degradation of the strength of the signal), and so forth. This information may also include determined or estimated or calculated information such as expected locations, direction, confidence are and so forth, as described herein. Information pertaining to an event or instance or information processed therefrom may be made available to various parties, as desired, such as automatically or upon request.

The input device(s) 1840 may include one or more devices that allow a user to input information. Examples of such devices include keypads, touch screens, and microphones. The output device(s) 1830 may include various devices, such as a display, and one or more audio speakers. Exemplary displays include liquid crystal displays (LCDs), and video displays. The system 1800 may or may not include such devices 1840 or 1830 depending on the type of system, e.g., server, etc.

The communication system 1802 may include a transceiver 1804 to transmit and receive information or data such as through wireless communications, and other communication interface(s) 1806 including for example Ethernet or serial or parallel or USB connection or other network interface (e.g., T1 line, cable, etc.) or so forth. In accordance with various embodiments, the transceiver 1804 may receive wireless signals transmitted across one or more geographic areas from one or more signal sources. The wireless signals may be for example radio or RF wireless signals from a variety of different frequencies or frequency ranges. The communication system 1802 may be configured to conduct communications including mobile or wireless communications and/or messaging or other forms of network messaging. Information pertaining to an observed event or instance pertaining to one or more objects may be made available to other parties either automatically or per request through the communication system 1802.

V. Conclusion

While various embodiments have been described above, it should be understood that they have been presented by way of example only, and not in limitation. For instance, although examples have been described with reference to 3G mobile networks or user equipment (UE) location-based service enabled networks, other wireless network architectures or backbones or communication protocols or wireless signaling or communications systems or technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   obtaining information with a receiver in a mobile communications network, concerning one or more characteristics of one or more monitored radio frequency (RF) signals transmitted across a geographic area from a transmitter in the mobile communications network; and
   detecting a presence of an object in the geographic area according to a variation of the one or more characteristics of one or more of the monitored RF signals, the variation caused by the object intersecting one or more of the monitored RF signals.

2. The method according to claim 1, wherein the one or more RF signals comprises one or more RF links between stationary signal source(s) and/or stationary receiver(s).

3. The method according to claim 2, wherein the one or more RF links form a plurality of grids over the geographic area.

4. The method according to claim 2, wherein the signal source(s) or receiver(s) are part of a wireless or mobile communications infrastructure.

5. The method according to claim 1, further comprising:
   detecting at least two instances of the object interfering with RF signals according to a variation of a characteristic of the RF signals at different times; and
   estimating a location of at least a terminating or originating route point of the at least two instances at which the object interfered with the RF signals.

6. The method according to claim 5, wherein the location is estimated based on at least a probability density function applied to possible terminating or originating route points.

7. The method according to claim 6, wherein the probability density function is customized.

8. The method according to claim 5, wherein the location is estimated based on at least a maximum speed constraint.

9. The method according to claim 5, further comprising determining a path of the object based on at least an estimated terminating or originating route point.

10. The method according to claim 9, further comprising:
    updating the path of the object as new instances of interference with the RF signals by the object are detected.

11. The method according to claim 5, wherein the plurality of RF signals form a plurality of grid areas in the geographic region, the estimating comprises:
    reducing an active grid area in the geographic area traversed by the object.

12. The method according to claim 11, wherein the reducing comprises:
    determining possible routes or possible originating and terminating route points in an active grid area bound by the RF signals interfered by the object and an assumed maximum speed of the object.

13. The method according to claim 12, further comprising:
    applying a weight to each possible route or each possible originating and terminating route point according to a probability density function (PDF),
    wherein the location of at least the terminating or originating route point of one of the at least two instances at which the object interfered with the RF signals is estimated based on the weighted possible routes or weighted possible originating and terminating route points.

14. The method according to claim 5, further comprising:
    determining an expected direction to be traveled or traveled by the object based on an estimated originating and terminating route point of two instances at which the object interfered with the RF signals.

15. The method according to claim 5, further comprising: determining a confidence area for an estimated terminating route point.

16. The method according to claim 1, further comprising: transmitting information pertaining to an object or lack of an object in the geographic area to a party, across a network.

17. The method according to claim 1, further comprising: storing information pertaining to each detected instance of an object interfering with an RF signal, the information including information pertaining to the interfered wireless signal and a time at which the interference occurred.

18. The method according to claim 1, wherein the variation comprises degradation of a signal strength of an RF signal.

19. The method according to claim 1, further comprising: filtering one or more of the RF signals to reduce noise.

20. The method according to claim 1, further comprising: displaying a layout of the RF signals over the geographic area and information pertaining to an object in the geographic area.

21. The method according to claim 1, further comprising: monitoring the one or more RF signals.

22. The method according to claim 1, wherein the one or more RF signals are received at a base station of a mobile network.

23. A system, comprising:
a transmitter in a mobile communications network, configured to transmit one or more radio frequency (RF) signals across a geographic area;
a receiver in the mobile communications network, configured to monitor one or more of the RF signals;
a processor configured to:
obtain information concerning one or more characteristics of one or more of the monitored radio frequency (RF) signals transmitted across a geographic area; and
detect a presence of an object in the geographic area according to a variation of the one or more characteristics of the one or more monitored RF signals, the variation caused by the object intersecting one or more of the monitored RF signals.

24. The system according to claim 23, wherein the transmitter and/or receiver are stationary.

25. The system according to claim 23, wherein the receiver is part of a LMU type of equipment interfacing a controlling network element.

26. The system according to claim 23, wherein the processor further detects at least two instances of the object interfering with RF signals according to a variation of a characteristic of the RF signals; and estimates a location of at least a terminating or originating route point for the at least two instances at which the object interfered with the RF signals.

27. The system according to claim 26, wherein the processor further:
determines possible routes or possible originating and terminating route points in an active grid area bound by the RF signals interfered by the object and an assumed maximum speed of the object; and
applies a weight to each possible route or each possible originating and terminating route point according to a probability density function (PDF),
wherein the location of at least the terminating or originating route point of one of the at least two instances at which the object interfered with the RF signals is estimated based on the weighted possible routes or weighted possible originating and terminating route points.

28. An apparatus, comprising:
a receiver in a mobile communications network, configured to monitor one or more RF signals transmitted across a geographic area from a transmitter in the mobile communications network;
a processor configured to:
obtain information concerning one or more characteristics of one or more of the monitored radio frequency (RF) signals transmitted across the geographic area; and
detect a presence of an object in the geographic area according to a variation of the one or more characteristics of the one or more monitored RF signals, the variation caused by the object intersecting one or more of the monitored RF signals.

29. A tangible computer medium having computer executable code which when executed by a computer performs the following method:
obtaining information with a receiver in a mobile communications network, concerning one or more characteristics of one or more monitored radio frequency (RF) signals transmitted across a geographic area from a transmitter in the mobile communications network; and
detecting a presence of an object in the geographic area according to a variation of the one or more characteristics of one or more of the monitored RF signals, the variation caused by the object intersecting one or more of the monitored RF signals.

30. A system, comprising:
a base station transmitter in a mobile communications network, configured to transmit one or more radio frequency mobile communications signals across a geographic area;
a base station receiver in the mobile communications network, configured to receive the one or more of the radio frequency mobile communications signals;
a processor coupled to the receiver, configured to:
monitor one or more characteristics of the one or more of the received radio frequency signals; and
detect a presence of an object in the geographic area according to a variation of the one or more characteristics of the one or more received radio frequency signals caused by the object intersecting the one or more received radio frequency signals.

31. A method, comprising:
monitoring by a base station receiver in a mobile communications network, one or more characteristics of one or more received radio frequency mobile communications signals transmitted across a geographic area by a base station transmitter in the mobile communications network; and
detecting by the receiver a presence of an object in the geographic area according to a variation of the one or more characteristics of the one or more received radio frequency signals caused by the object intersecting the one or more received radio frequency signals.

* * * * *